United States Patent
Stripe et al.

(10) Patent No.: US 10,558,508 B1
(45) Date of Patent: Feb. 11, 2020

(54) SYSTEM AGNOSTIC FRONT END APPLICATION FOR LEGACY SYSTEMS

(71) Applicant: AMERICAN AIRLINES, INC., Fort Worth, TX (US)

(72) Inventors: Harry E. Stripe, Flower Mound, TX (US); Kyle Edward Wander, Tulsa, OK (US); Tedd Dale Adams, Tulsa, OK (US); Justin Eldon Kerchal, Gilbert, AZ (US)

(73) Assignee: American Airlines, Inc., Fort Worth, TX (US)

( * ) Notice: Subject to any disclaimer, the term of this patent is extended or adjusted under 35 U.S.C. 154(b) by 0 days.

(21) Appl. No.: 16/445,677

(22) Filed: Jun. 19, 2019

Related U.S. Application Data

(62) Division of application No. 15/337,473, filed on Oct. 28, 2016, now Pat. No. 10,372,515.

(60) Provisional application No. 62/248,427, filed on Oct. 30, 2015.

(51) Int. Cl.
  *G06F 9/00* (2006.01)
  *G06F 9/54* (2006.01)
  *H04L 29/08* (2006.01)

(52) U.S. Cl.
  CPC .............. *G06F 9/546* (2013.01); *H04L 67/02* (2013.01)

(58) Field of Classification Search
  USPC ....................................................... 701/29.6
  See application file for complete search history.

(56) References Cited

U.S. PATENT DOCUMENTS

| | | |
|---|---|---|
| 5,390,314 A | 2/1995 | Swanson |
| 5,574,934 A | 11/1996 | Mirashrafi et al. |
| 5,652,759 A | 7/1997 | Stringfellow, Jr. |
| 6,122,642 A | 9/2000 | Mehovic |
| 6,707,472 B1 | 3/2004 | Grauman |
| 7,788,722 B1 | 8/2010 | Njemanze |
| 8,332,473 B1 | 12/2012 | Fouts et al. |
| 2002/0133566 A1 | 9/2002 | Teeple |
| 2002/0198747 A1 | 12/2002 | Boyer et al. |
| 2003/0115272 A1 | 6/2003 | Muttitt et al. |
| 2003/0140131 A1 | 7/2003 | Chandrashekhar et al. |
| 2003/0179228 A1 | 9/2003 | Schreiber |
| 2005/0005116 A1 | 1/2005 | Kasi et al. |
| 2005/0010644 A1 | 1/2005 | Brown et al. |
| 2005/0038863 A1 | 2/2005 | Onyon et al. |

(Continued)

OTHER PUBLICATIONS

USPTO, Office Action dated Dec. 19, 2016, in U.S. Appl. No. 14/527,420 (20 pages).

(Continued)

*Primary Examiner* — James M McPherson

(74) *Attorney, Agent, or Firm* — Haynes and Boone, LLP

(57) ABSTRACT

A system and method for accessing data in one of a first legacy computer system that has a first operating system and a second legacy computer system that has a second operating system that is different from the first operating system. The method includes providing a front end application that is in communication with the first and second legacy computer systems, with the application being displayed on a user interface of a computer. Aircraft and maintenance data of a first legacy airline is associated with the first legacy computer system and aircraft and maintenance data of a second legacy airline is associated with the second legacy computer system.

20 Claims, 16 Drawing Sheets

(56) References Cited

U.S. PATENT DOCUMENTS

| | | |
|---|---|---|
| 2005/0246193 A1 | 11/2005 | Roever et al. |
| 2006/0064459 A1* | 3/2006 | Matsushima ......... H04L 67/025 709/203 |
| 2006/0112139 A1 | 5/2006 | Maple et al. |
| 2008/0184270 A1 | 7/2008 | Cole |
| 2009/0138871 A1* | 5/2009 | Kimberly .................. G06F 8/61 717/173 |
| 2009/0233622 A1 | 9/2009 | Johnson |
| 2011/0176617 A1 | 7/2011 | Fagan |
| 2017/0155763 A1 | 6/2017 | Bekanich |

OTHER PUBLICATIONS

USPTO, Notice of Allowance dated Apr. 4, 2019 in U.S. Appl. No. 15/337,473 (19 pages).

* cited by examiner

SYSTEM AGNOSTIC FRONT END APPLICATION FOR LEGACY SYSTEMS

CROSS-REFERENCE TO RELATED APPLICATIONS

This application is a division of U.S. application Ser. No. 15/337,473, filed Oct. 28, 2016, which claims the benefit of the filing date of, and priority to, U.S. Application No. 62/248,427, filed Oct. 30, 2015, the entire disclosures of which are hereby incorporated herein by reference.

BACKGROUND

When two airlines and their aircraft fleets and maintenance crews merge, mechanics are required to service aircraft from each of the two fleets. Generally, data associated with one of the airlines is stored in a first legacy computer system and data associated with another airline is stored in a second legacy computer system. At some point, a mechanic that is familiar with the first legacy computer system must service an aircraft having data stored in the second legacy computer system. Assuming the first and second legacy systems are different, the mechanic must learn, understand, and use different commands, data inputs, parameters, and formatting for each of the first and second legacy systems. Similarly, training and qualification data for each mechanic within the two airlines is stored in either the first or second legacy computer systems. Thus, in order to evaluate whether a mechanic associated with the first legacy computer system is qualified to complete a maintenance task associated with an aircraft having data stored in the second legacy computer system, two different legacy computer systems must be accessed. This may result in increased risk of non-compliance.

Therefore, what is needed is a system, method, or apparatus that addresses one or more of the foregoing issues, among others.

DETAILED DESCRIPTION

Figure 1:
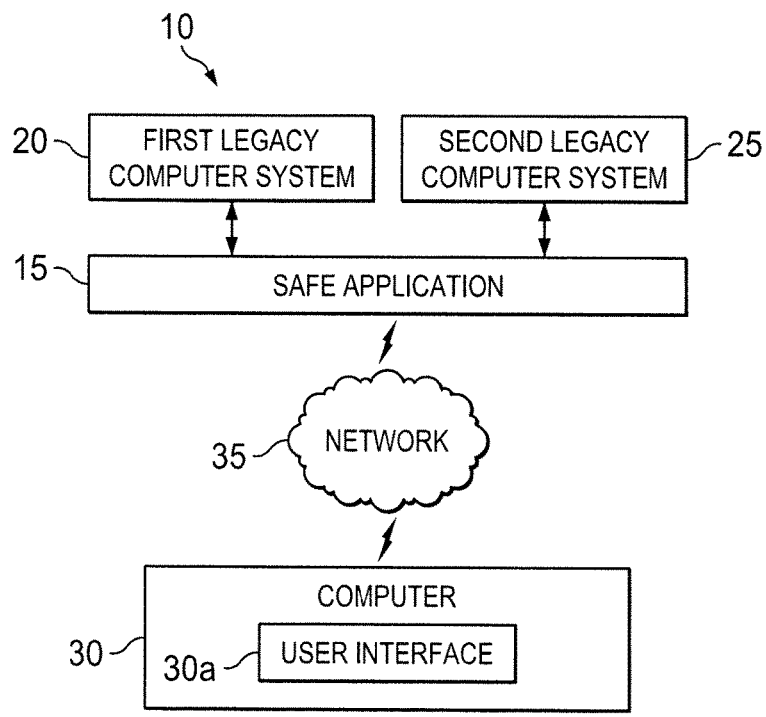
FIG. 1 is a diagrammatic illustration of a system, according to an exemplary embodiment.

The following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

In an exemplary embodiment, as illustrated in FIG. 1, a system generally referred to by the reference numeral 10 includes a System Agnostic Front End ("SAFE") application 15, which provides a common "front end" application that is in communication with both a first legacy computer system 20 (e.g., legacy system of American Airlines) of a first legacy airline (e.g., American Airlines) and a second legacy computer system 25 (e.g., legacy system of US Airways) of a second legacy airline (e.g., US Airways) to ensure regulatory compliance and to accelerate adoption of a single process, such as a single maintenance process. Generally, a "front end" application is an application that a user, using a computer 30 that includes a graphical user interface 30a, interacts with directly via a network 35. Generally, the SAFE application 15 is a web-based application that is accessed on the computer 30 using a web browser. In an exemplary embodiment, the SAFE application 15 is generally a multi-tier application such that presentation, application processing, and data management functions are physically separated.

In an exemplary embodiment, the first legacy computer system 20 includes an operating system that is different from an operating system of the second legacy computer system 25. In an exemplary embodiment, the first legacy computer system 20 and the second legacy computer system 25 have differences in data schema. The operating system of the first legacy computer system 20 is a Semi-Automatic Business Research Environment ("SABRE") system. In an exemplary embodiment, the operating system of the second legacy computer system 25 is a System Computerized for Economical Performance, Tracking, Recording, and Evaluation ("SCEPTRE") system. A command to perform an action in the operating system for the first legacy computer system 20 is generally different from, or not the same as, a command to perform the same action in the operating system for the second legacy computer system 25. Additionally, the first legacy computer system 20 is a non-web based system so that accessing the first legacy computer system 20 requires access to specific hardware on which the first legacy computer system 20 is installed. Similarly and in an exemplary embodiment, the second legacy computer system 25 is a non-web based system so that accessing the second legacy computer system 25 requires access to specific hardware on which the second legacy computer system 25 is installed. Thus, to execute a generic command, such as to search for data relating to an aircraft or to create a logbook entry associated with the aircraft on which a user is working, the user must determine whether data associated with the aircraft is associated with the first legacy computer system 20 or the second legacy computer system 25. After determining which legacy computer system is associated with the aircraft, the user must access the specific hardware on which either the first legacy computer system 20 or the second legacy computer system 25 is installed. After which, the user must enter commands that are specific to either the first legacy computer system 20 or the second legacy computer system 25 in order to search for data relating to the aircraft and/or to create the logbook entry associated with the aircraft. In response to the user's request to search for data relating to the aircraft or to create the logbook entry, maintenance history for the aircraft may be viewed on a graphical user interface of the specific hardware that the user is accessing. This requires that the user have access to specific hardware on which both the first legacy computer system 20 and the second legacy computer system 25 are installed and be familiar with the specific commands associated with each of the first legacy computer system 20 and the second legacy computer system 25. Considering at least some of the inputs and management of data for the first legacy computer system 20 and the second legacy computer system 25 are not the same, errors can occur when having to switch between the legacy computer systems 20 and 25. The user may also inadvertently follow an incorrect procedure associated with one legacy computer system when needing to follow another procedure associated with the other of the legacy computer systems. Also, this allows for little to no input validation and error handling for inputs received via the hardware on which either the first legacy computer system 20 or the second legacy computer system 25 is installed. Moreover, training and qualification data for a mechanic or employee of the first legacy airline is stored in the first legacy computer system 20 while the training and qualification data for a mechanic or employee of the second legacy airline is stored in the second legacy computer system 25. Thus, in order to evaluate whether a mechanic associated with the first legacy airline is qualified to complete a maintenance task associated with an aircraft having data stored in the second legacy computer system 25, the qualification data for the mechanic must be accessed in the first legacy computer system 20 while other data pertaining to the aircraft must be accessed in the second legacy computer system 25. This may result in increased risk of non-compliance related to mechanics being assigned to work that he or she is not currently qualified to do. In this case and when a mechanic is not authorized or qualified to perform a task, the user or mechanic is considered an unauthorized user or mechanic to complete the task. Moreover, there is an increased risk of non-compliance due to a mechanic maintaining an aircraft associated with the first legacy airline using maintenance procedures from the second legacy airline.

Figure 2:
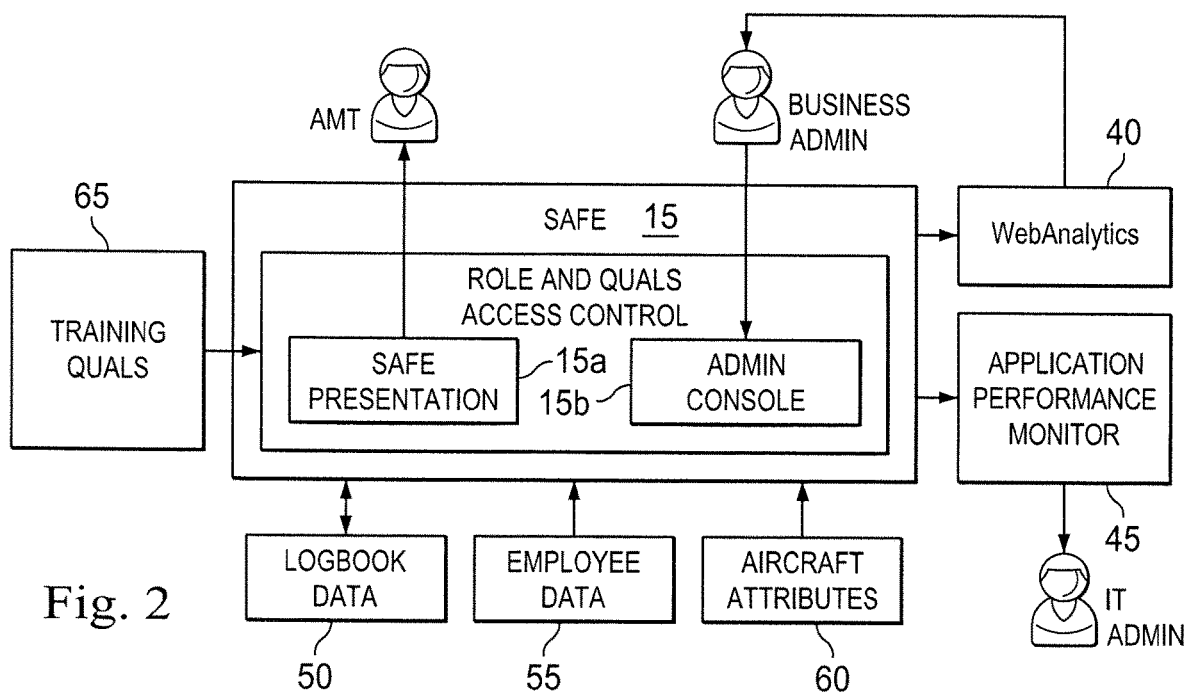
FIG. 2 is a conceptual architecture view of the system of FIG. 1, according to an exemplary embodiment.

In an exemplary embodiment and as illustrated in FIG. 2, the SAFE application 15 is configured to access, update, or produce data to be used in a Web Analytics application 40 and/or an Application Performance Monitor application 45. The SAFE application 15 is also configured to access, update, or produce data such as logbook data 50, employee data 55, aircraft attributes data 60, and training qualification data 65. Additionally, the SAFE application 15 may include a SAFE presentation 15a and an admin console 15b that together create a Role and Qualification Access Control application. The user, or an aircraft mechanic technician ("AMT"), may interact with the SAFE presentation 15a in that the SAFE presentation 15a is displayed on the user interface 30a of the computer 30. In an exemplary embodiment, a business administration group or other designated user or group of designated users can manage user and user role data for users of the system 10 and manage, alter, and edit the aircraft data via the admin console 15b. Moreover, the business administration group or other group of designated users may be provided data regarding the system 10 using the Web Analytics application 40. An Information Technology ("IT") group of users can monitor application performance of the SAFE application 15 via the Application Performance Monitor application 45.

Figure 3:
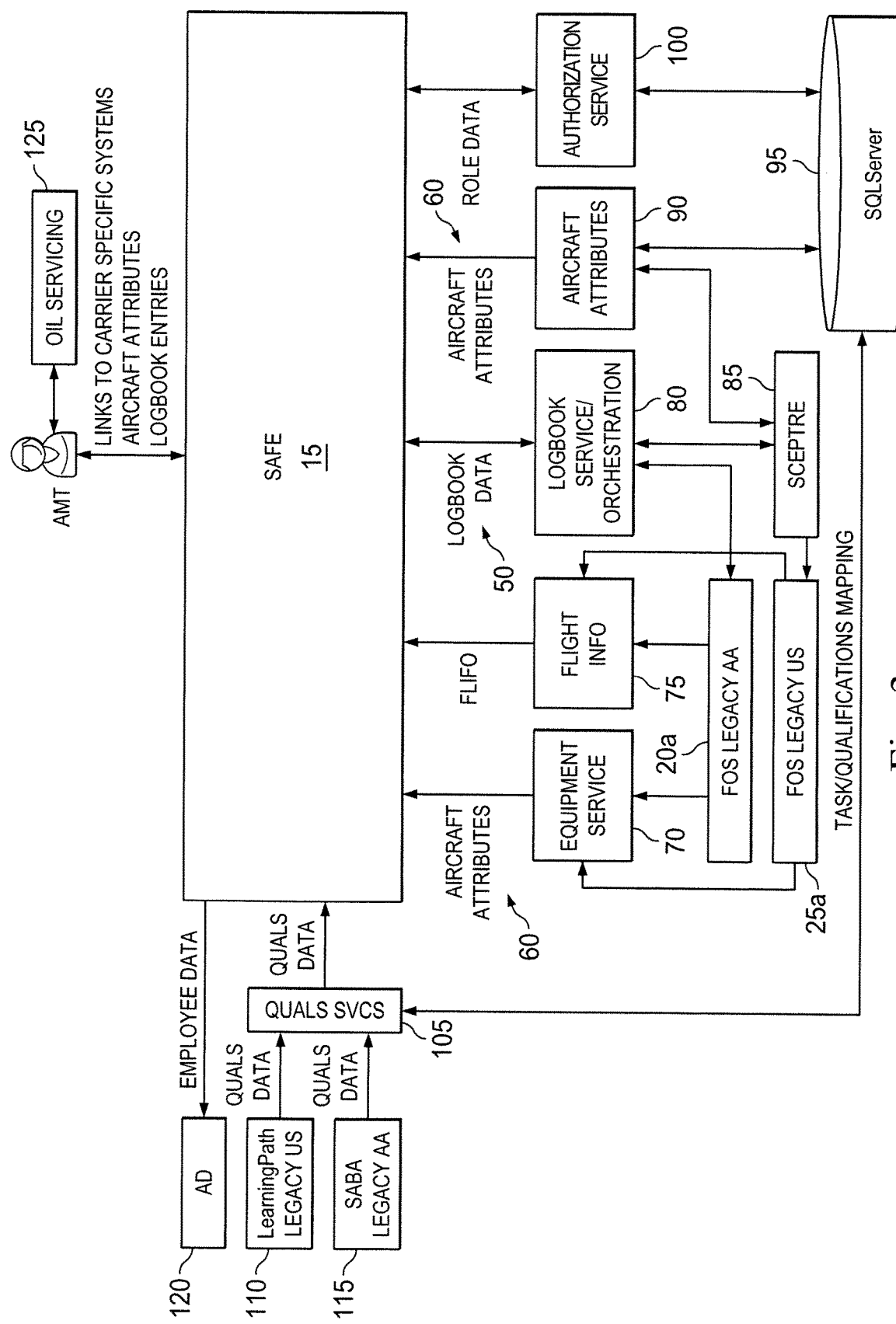
FIG. 3 is a data architecture view of the system of FIG. 1, according to an exemplary embodiment.

In an exemplary embodiment, and as illustrated in FIG. 3, Flight Operating Systems ("FOS") 20a for first legacy computer system 20 and a FOS 25a for the second legacy computer system 25 provide data to an equipment service system 70, which, in turn provides at least a portion of the aircraft attributes data 60 to the SAFE application 15. Generally, the aircraft attributes data 60 includes a nose number, a fleet type, a registration, a carrier, etc. of an aircraft. The FOS 20a and FOS 25a also provide data to a Flight Information system 75, which, in turn provides flight information and flight following ("FLIFO") data to the SAFE application 15. The FOS 20a and a Logbook Service/Orchestration system 80 also exchange data. The Logbook Service/Orchestration system 80 also exchanges, with the SAFE application 15, data such as at least a portion of the logbook data 50. A SCEPTRE system 85 provides data to the FOS 25a. Data is exchanged between the SCEPTRE system 85 and both the Logbook Service/Orchestration system 80 and an Aircraft Attributes system 90. The Aircraft Attributes system 90 provides at least a portion of the aircraft attributes data 60 to the SAFE application 15. Moreover, the Aircraft Attributes system 90 and a SQL Server 95 exchange data. The SQL Server 95 also exchanges data with an Authorization Service system 100 and a Qualifications Service System 105. For example, the SQL Server 95 may exchange task and qualifications mapping data with the Qualifications Service System 105. Additionally, the SQL server 95 may manage data for any one or more of the following: aircraft attributes that are not available in the first legacy computer system 20 and the second legacy computer system 25; qualifications required to perform defined tasks; and role management for authorization. In an exemplary embodiment, the Qualification Service System 105 may provide additional logic such as task-to-qualification mapping and adding filters based on locations. The Authorization service system 100 also exchanges role data with the SAFE application 15. Both a Learning Path system 110 and a SABA system 115 provide data, such as qualification data pertaining to mechanics or other users, to the Qualification Service system 105, which, in turn provides Qualification data to the SAFE application 15. In some exemplary embodiments, the SABA system 115 forms a portion of the first legacy computer system 20 and the Learning Path system 110 forms a portion of the second legacy computer system 25. The SAFE application 15 provides at least a portion of the employee data 55 to an AD system 120. For example, the employee data may include employee identification number ("EID") of an employee, the cost center associated with that employee, and a station/branch associated with that employee. In an exemplary embodiment, the SAFE application 15 exchanges data with the AMT, which, in turn exchanges data with an Oil Service system 125. In an exemplary embodiment, the SAFE application 15 provides links to the Oil Servicing system 125 and carrier-specific manuals. In an exemplary embodiment, oil servicing data is a link to the aircraft Oil Servicing system 125. However, the SAFE application 15 may exchange data directly with the Oil Servicing system 125 without interaction from the AMT. That is, the system 10 may make calls directly to the Oil Servicing system 125 to retrieve data rather than deep linking to the Oil Servicing system 125. In an exemplary embodiment, the SAFE application 15 provides links to carrier specific systems, provides at least a portion of the aircraft attributes data 60, and at least a portion of the logbook data 50 to the AMT. As such, the SAFE application 15 allows for the AMT to edit, input, or view data stored within or associated with the FOS 20a and the FOS 25a. The SAFE application 15 may also provide a mechanism for other applications to deep link into the SAFE application 15 by providing aircraft information, such as nose number and carrier. The SAFE application 15 may provide users with a view of aircraft history and attributes to help ensure compliance with a maintenance program prior to receiving a single operating certificate. In an exemplary embodiment and after receiving a single operating certificate, the SAFE application 15 includes a webpage that provides fast access for common AMT activities.

Figure 4:
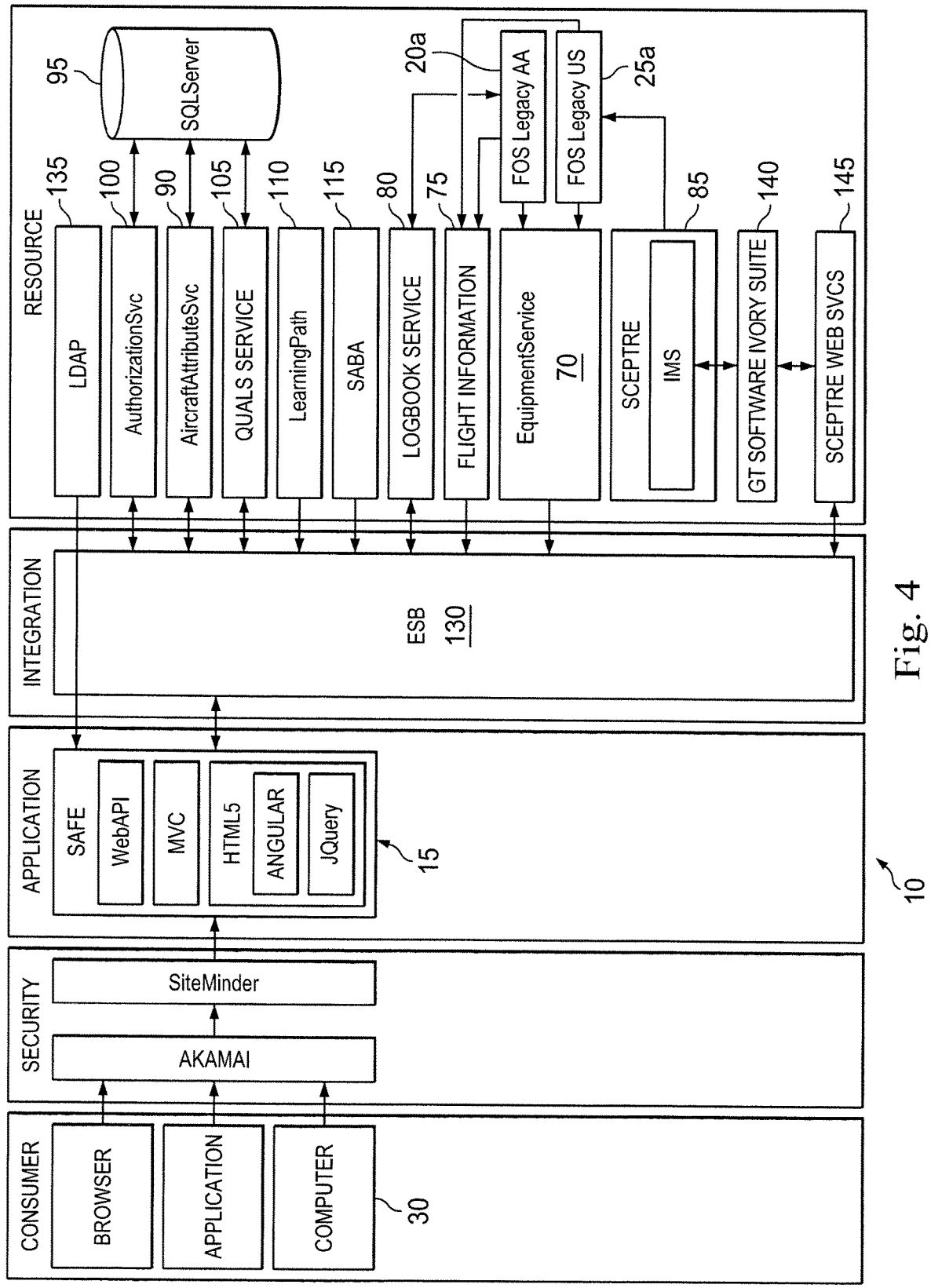
FIG. 4 is a logical architecture view diagram of the system of FIG. 1, according to an exemplary embodiment.

FIG. 4 is a logical view diagram of one exemplary embodiment of the system 10 that includes a consumer layer, a security layer, an application layer, an integration layer including an Enterprise Service Bus ("ESB") 130, and a resource layer. In an exemplary embodiment, the presentation layer of the SAFE application 15 includes AngularJS and/or JQuery. In an exemplary embodiment, the application layer of the SAFE application 15 includes Web API and MVC, such as Razor. Generally, a LDAP 135, the Authorization service system 100, the Aircraft Attributes system 90, the SQL Server 95, the Qualification Service system 105, the Learning Path system 110, the SABA system 115, the equipment service system 70, the flight Information system 75, the FOS 20a, the FOS 25a, the Logbook Service/ Orchestration system 80, the SCEPTRE system 85, a GT Software Ivory Suite 140, and a SCEPTRE Web service 145 is included in the resource layer and generally communicate with the application layer via the ESB 130.

Figure 5:
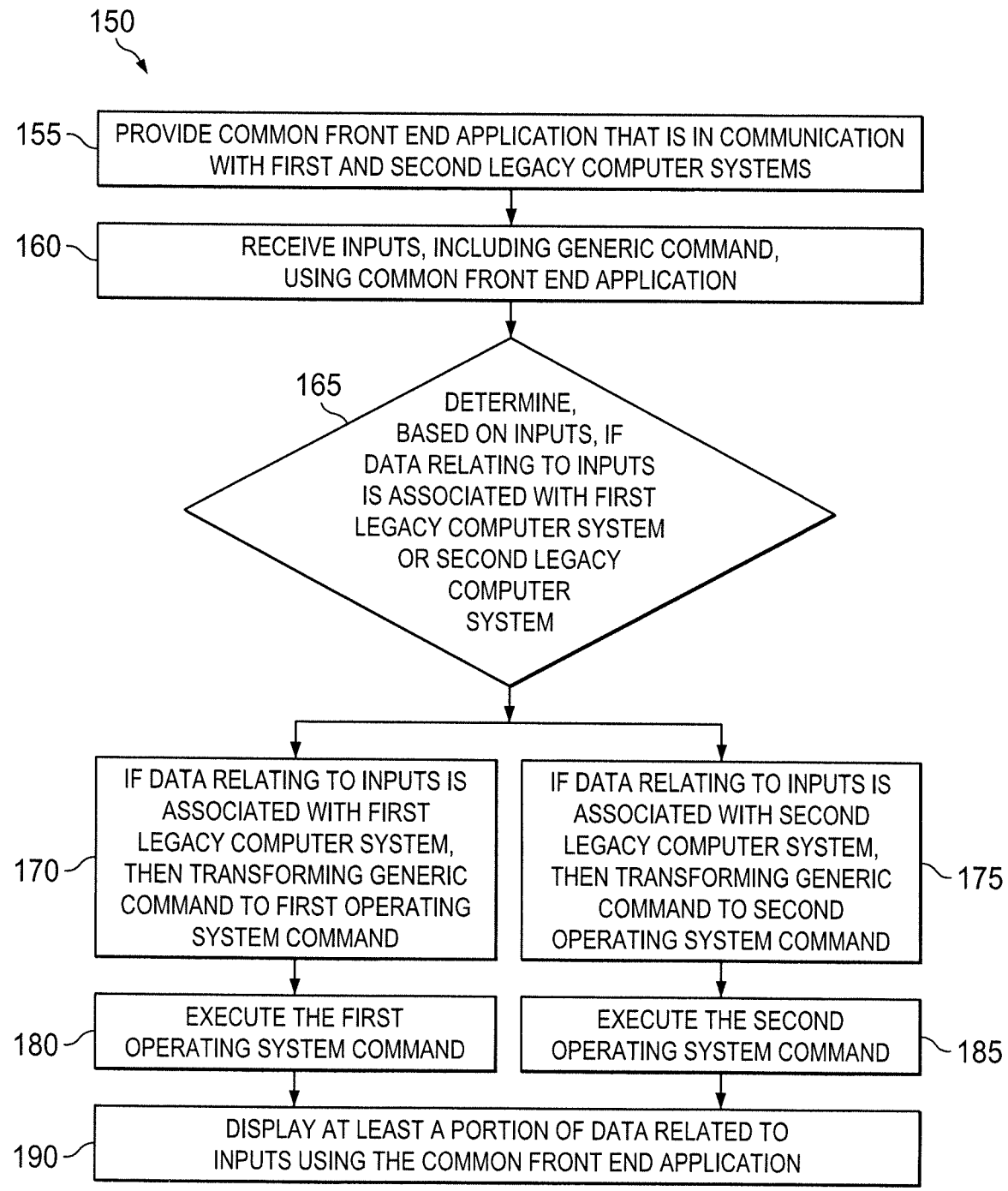
FIG. 5 is a flow chart illustration of a method implemented in whole or in part using the system of FIG. 1, according to an exemplary embodiment.

In an exemplary embodiment, as illustrated in FIG. 5 with continuing reference to FIGS. 1-4 and FIGS. 6A-6E, a method of accessing data in one of the first legacy computer system 20 and the second legacy computer system 25 is generally referred to by the reference numeral 150. In an exemplary embodiment, the method 150 includes providing a common front end application, such as the SAFE application 15, that is in communication with the first legacy computer system 20 and the second legacy computer system 25 at step 155; receiving inputs, including a generic command, using the SAFE application 15 at step 160; determining, based on the inputs, if data relating to the inputs is associated with the first legacy computer system 20 or the second legacy computer system 25 at step 165; if the data relating to the inputs is associated with the first legacy computer system 20, then transforming the generic command to a first operating system command at step 170; if the data relating to the inputs is associated with the second legacy computer system 25, then transforming the generic command to a second operating system command at step 175; after the step 170, the method 150 further includes executing the first operating system command at step 180; after the step 175, the method further includes executing the second operating system command at step 190; and after either the step 180 or the step 185, the method 150 includes displaying at least a portion of the data related to the inputs using the SAFE application 15 at step 190.

At the step 155, the SAFE application 15 is provided such that the SAFE application 15 is in communication with the first legacy computer system 20 and the second legacy computer system 25. Because the SAFE application 15 is a web-based application that is in communication with, and configured to access, the first legacy computer system 20 and the second legacy computer system 25, a user of the SAFE application 15 is capable of accessing the first legacy computer system 20 and the second legacy computer system 25 using a web browser. This prevents the user from having to find and access hardware on which either the first legacy computer system 20 and/or the second legacy computer system 25 is installed.

Figure 6A:
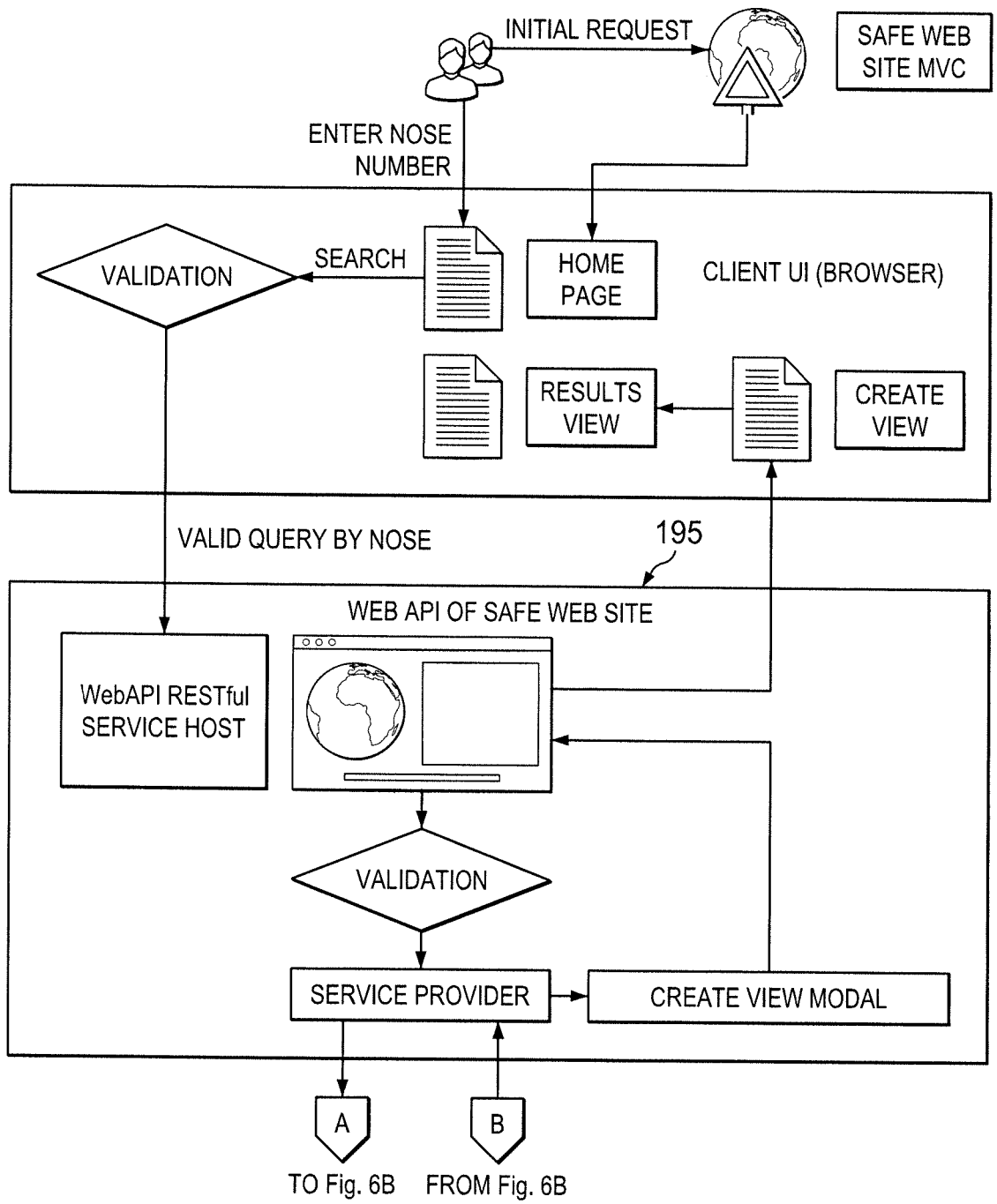
FIGS. 6A-6E are flow chart illustrations of a process flow of the system of FIG. 1, according to an exemplary embodiment.
Figure 6B:
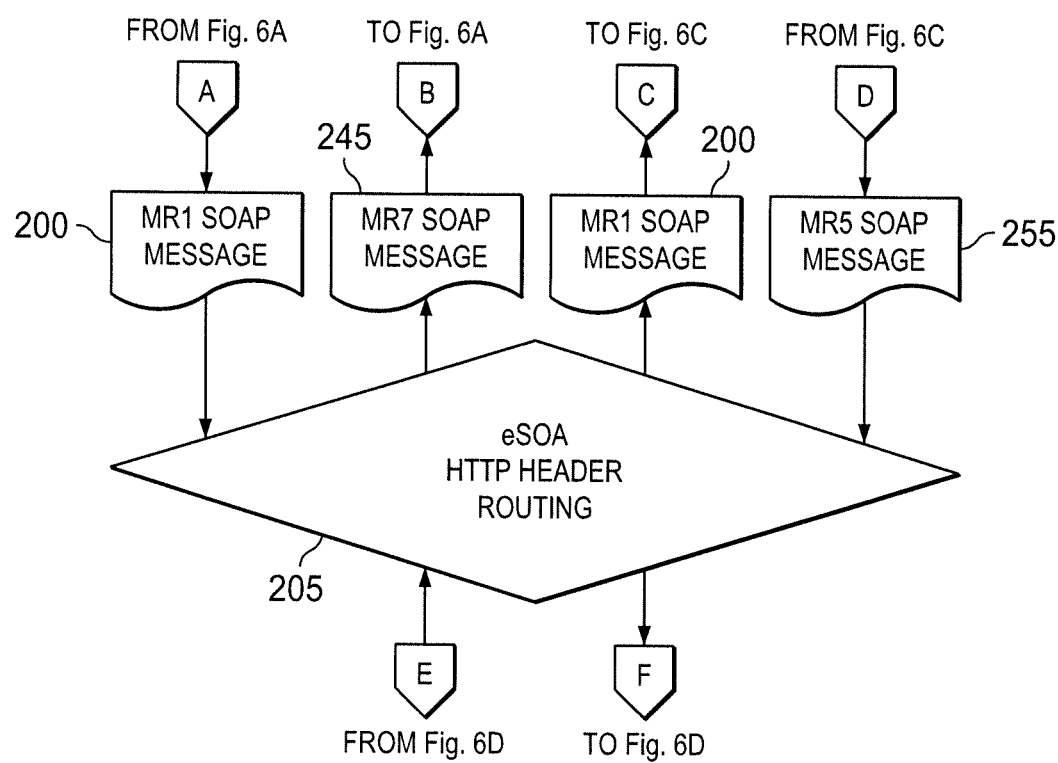
Figure 6C:
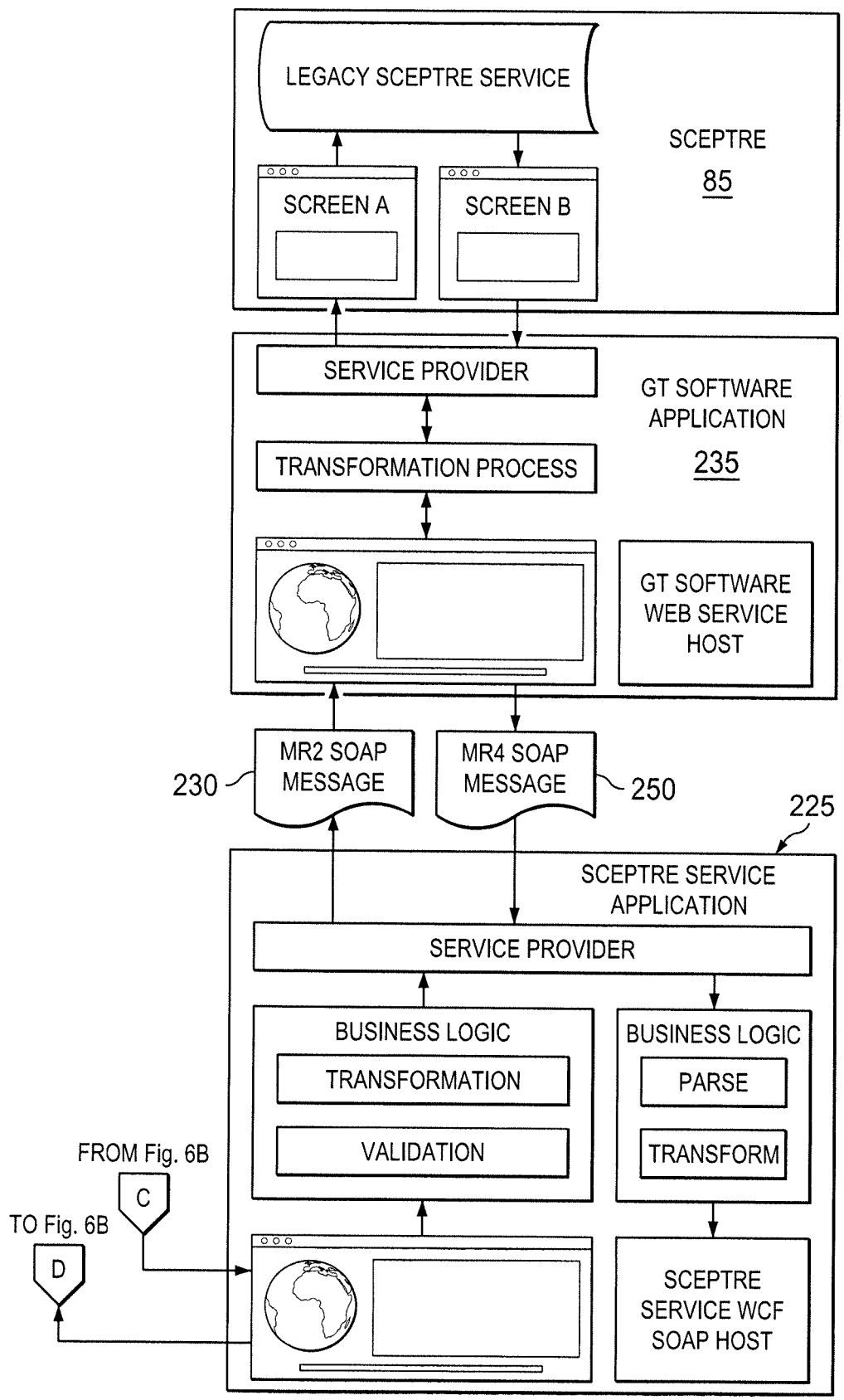
Figure 6D:
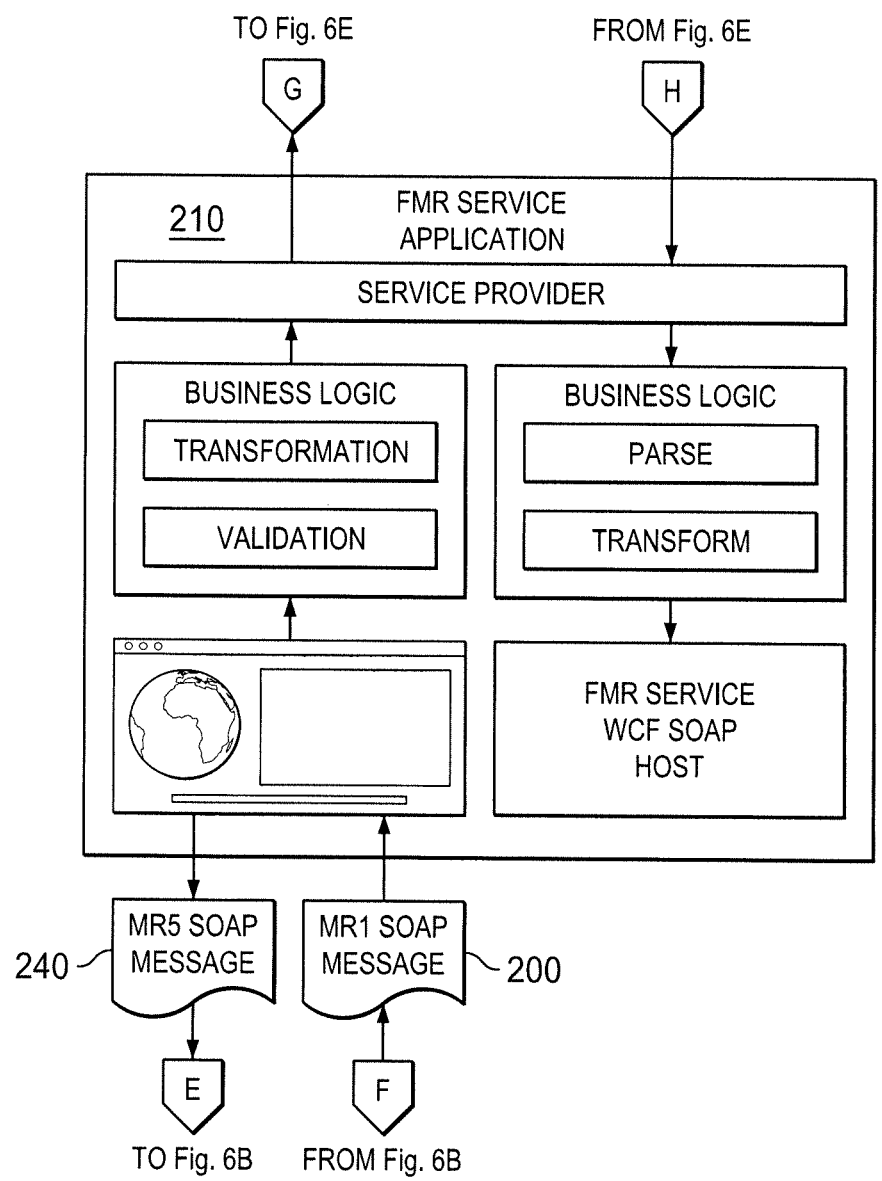
Figure 6E:
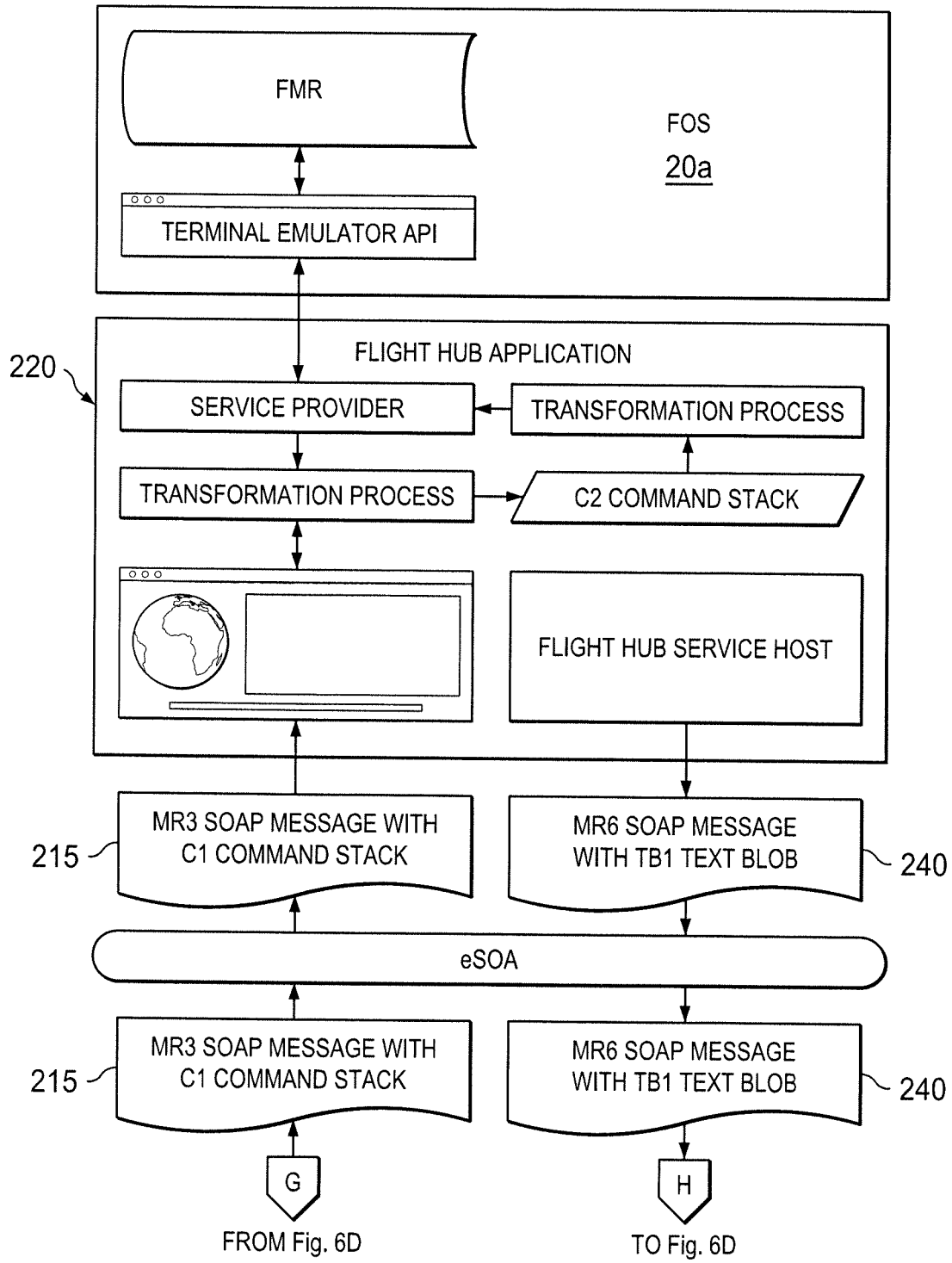

At the step 160, inputs are received using the SAFE application 15. The inputs are generally received in response to the user interface 30a displaying a webpage that receives inputs. Generally, the inputs include a generic command that is generic to the first legacy computer system 20 and the second legacy computer system 25; an aircraft identifier such as a nose number; and an employee identifier, such as an employee number or user number. In an exemplary embodiment, the submission or entering of the aircraft identifier and/or the employee identifier automatically generates a generic query command. Thus, the generic command of "query" is automatically "received" by the SAFE application 15 upon the entry of the aircraft identifier or the employee identifier. An example of a generic command is to search for, or query, or identify data relating to an aircraft. In another exemplary embodiment, and in the event that two separate aircrafts are associated with the same nose number, the user is required to validate the fleet type of the aircraft by providing an input regarding the fleet type of the aircraft. The inputs may also include a flight number, a date, an ARM or FMR code, etc. As illustrated in FIG. 6A, the user may be directed to a home webpage of a SAFE webpage. The SAFE webpage and/or a web application program interface ("API") 195 may receive the nose number, search for the nose number, and validate the nose number. In an exemplary embodiment, the system 10 requests an identifier of an aircraft, such as a nose number from the user and then routes the user to a webpage that displays links for the user, such as a mechanic, for the various mechanic activities based on the carrier. In another exemplary embodiment and in the event that two separate aircrafts are associated with the same nose number, the user is required to validate the fleet type of the aircraft. Generally, a JSON object is generated using at least one of the inputs and then sent to the API 195. After receiving the JSON object, the API 195 then generates a first SOAP message 200 (shown in FIG. 6B), based on the JSON object that was generated using at least one of the inputs. In some exemplary embodiments, the first SOAP message 200 includes a header that is used to route the first SOAP message using a router 205, as illustrated in FIG. 6B. In an exemplary embodiment, the header of the first SOAP message 200 includes a first legacy computer system identifier or a second legacy computer system identifier. In an exemplary embodiment, at least one of the inputs is the first legacy computer system identifier or the second legacy computer system identifier.

At the step 165, it is determined, based on the inputs, if the data relating to the inputs is associated with the first legacy computer system 20 or the second legacy computer system 25. In an exemplary embodiment, the router 205 is remote from the computer 30 and determines whether the data relating to the inputs is associated with the first legacy computer system 20 or the second legacy computer system 25. In an exemplary embodiment, the determination is based on the header of the first SOAP message 200. In an exemplary embodiment, the router 205 is an enterprise service-oriented architecture ("eSOA") with HTTP header routing. When the inputs include an aircraft identifier, it is determined whether data relating to the aircraft having the aircraft identifier is stored within the first legacy computer system 20 or the second legacy computer system 25. When the inputs include an employee identifier, the system 10 determines whether data, such as qualifications and certifications, relating to the employee identifier is stored in the first legacy computer system 20 or the second legacy computer system 25.

At the step 170, if the data relating to the inputs is associated with the first legacy computer system 20, then the generic command is transformed into a first operating system command. In an exemplary embodiment, transforming the generic command to the first operating system command includes generating, at an application 210 (shown in FIG. 6D) that is different from the SAFE application 15, a second SOAP message 215 (shown in FIG. 6E) using the first SOAP message 200, the second SOAP message 215 having a first command stack. Then, at a third application 220, a second command stack using the second SOAP message 215 is generated, with the second command stack being used to execute the generic command at the first legacy computer system 20. Thus, the second SOAP message 215 is transformed or used to create a first operating system command that is executable by the first legacy computer system 20, which includes the FOS 20a.

At the step 175, if the data relating to the inputs is associated with the second legacy computer system 25, then the generic command is transformed into a second operating system command. In an exemplary embodiment, transforming the generic command to the second operating system command includes generating, at an application 225 (shown in FIG. 6C) that is different from the SAFE application 15 and the applications 210 and 220, a third SOAP message 230 using the first SOAP message 200. The third SOAP message 230 is received at an application 235 and is transformed or used to create a second operating system command that is executable by the second legacy computer system 25, which includes the SCEPTRE system 85. Generally, a SCEPTRE service sends an XML file representing a SCEPTRE "screen" to GT.

At the step 180, the first operating system command is executed or processed by the first legacy computer system 20. In an exemplary embodiment, the generic command may be to update or edit the data relating to the inputs, and executing the first operating system command updates data relating to the inputs in the first legacy computer system 20. When executing the first operating system command, the application 220 generates a fourth SOAP message 240 (shown in FIG. 6D), which is received and then sent by the application 210. The router 205 receives the fourth SOAP message 240 and then generates, based on the fourth SOAP message 240, a fifth SOAP message 245 (shown in FIG. 6C). The fifth SOAP message 245 is received at the API 195.

At the step 185, the second operating system command is executed or processed by the second legacy computer system 25. In response to receipt of the XML file representing the SCEPTRE "screen", GT sends "screen" to SCEPTRE and provides an XML response to the SCEPTRE service. The SCEPTRE service then generate and sends a sixth SOAP message 250 (shown in FIG. 6C) that is sent to the application 225, which generates a seventh SOAP message 255 based on the sixth SOAP message 250. At the router 205, the sixth SOAP message 250 is transformed into the fifth SOAP message 245. The fifth SOAP message 245 is received at the API 195.

At the step 190, the SAFE application 15 displays at least a portion of the data related to the inputs on the user interface 30a using a web browser. Based on the fifth SOAP message 245, the API 195 sends a REST response such that a webpage, which contains results viewable by the user, is displayed on the user interface 30a. Considering the webpage containing results viewable by the user is based on the fifth SOAP message 245, which is a result of either the execution of the first operating system command or the second operating system command, the view to the user is independent of the first legacy computer system 20 and the second legacy computer system 25. The SAFE application 15 provides a single common front end application that provides similar views to the user regardless of whether the user is accessing data in the first legacy computer system 20 or the second legacy computer system 25. In an exemplary embodiment, the SAFE application 15 and/or the system 10 is a tool to direct mechanics to backend systems relating to an aircraft maintenance logbook, training and/or qualifications, Oil Service programs, and FLIFO by allowing them to enter maintenance information into legacy systems without having extensive training on those systems. In an exemplary embodiment and in regards to aircraft maintenance logbook, data is entered into each of the legacy systems using unique forms for each legacy system, with the unique forms having a common (to that legacy system) look and order of fields. In an exemplary embodiment, the labels and data field nomenclature of the SAFE webpage incorporate both the processes of the first legacy airline and the second legacy airline, with differences between those processes being denoted by greying out comments within the form presented by the SAFE webpage. In an exemplary embodiment, maintenance release, placarding, and logbook processes have a common look and feel when presented by the SAFE application 15. The operational manuals/procedures of the first and second legacy airlines are harmonized using the SAFE application 15. In an exemplary embodiment and in regards to training and/or qualifications, management and mechanics may access an individual's current training and/or qualifications from both the first legacy computer system 20 and the second legacy computer system 25, to ensure that mechanics are not assigned to work on aircraft and/or tasks that they are not currently qualified on, per each of the first and second legacy airlines' training requirements. In an exemplary embodiment, the SAFE application 15 creates an automation to alert mechanics of their qualifications, upon selection of nose number of an aircraft, if he or she is qualified to perform the task. In an exemplary embodiment and in regards to the FLIFO, the SAFE application 15 may present to the mechanic, via a webpage displayed on the graphical user interface 30a, current aircraft location and routing data. In an exemplary embodiment, displaying at least as portion of the data related to the inputs on the user interface 30a may include routing the user to a webpage in a web browser that displays links for the user, such as a mechanic, for the various mechanic activities based on the carrier. Additionally, the SAFE application 15 is configured to restrict views and entries to the SAFE application 15 based on the user roles as well as qualifications, determined by the employee identifier, in order to help ensure regulatory compliance. For example, when the user is an unauthorized user, no work instructions regarding the task is displayed to the user thereby preventing the user from completing the work.

Figure 7A:
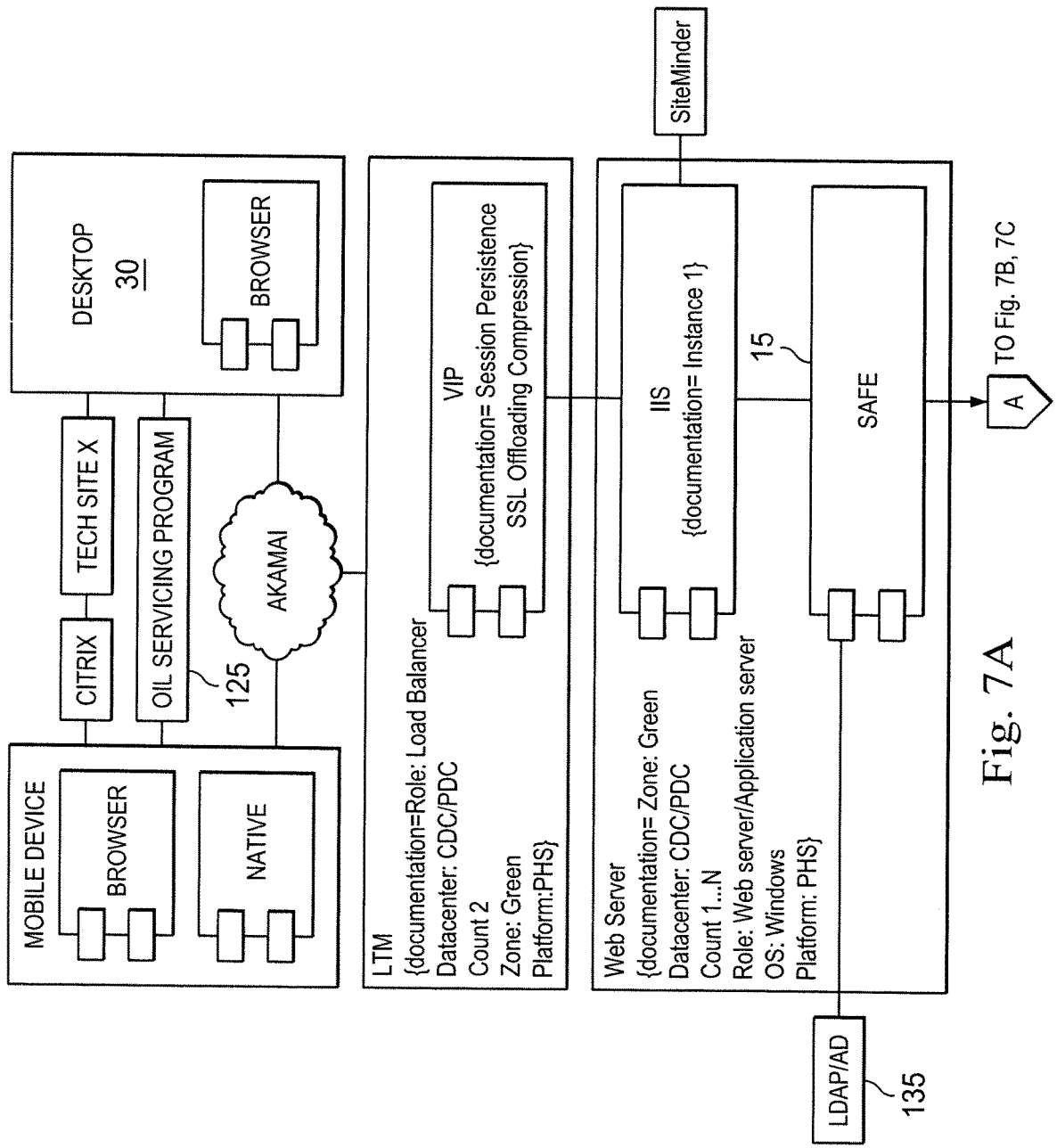
FIGS. 7A-7C are configuration views of the system of FIG. 1, according to an exemplary embodiment.
Figure 7B:
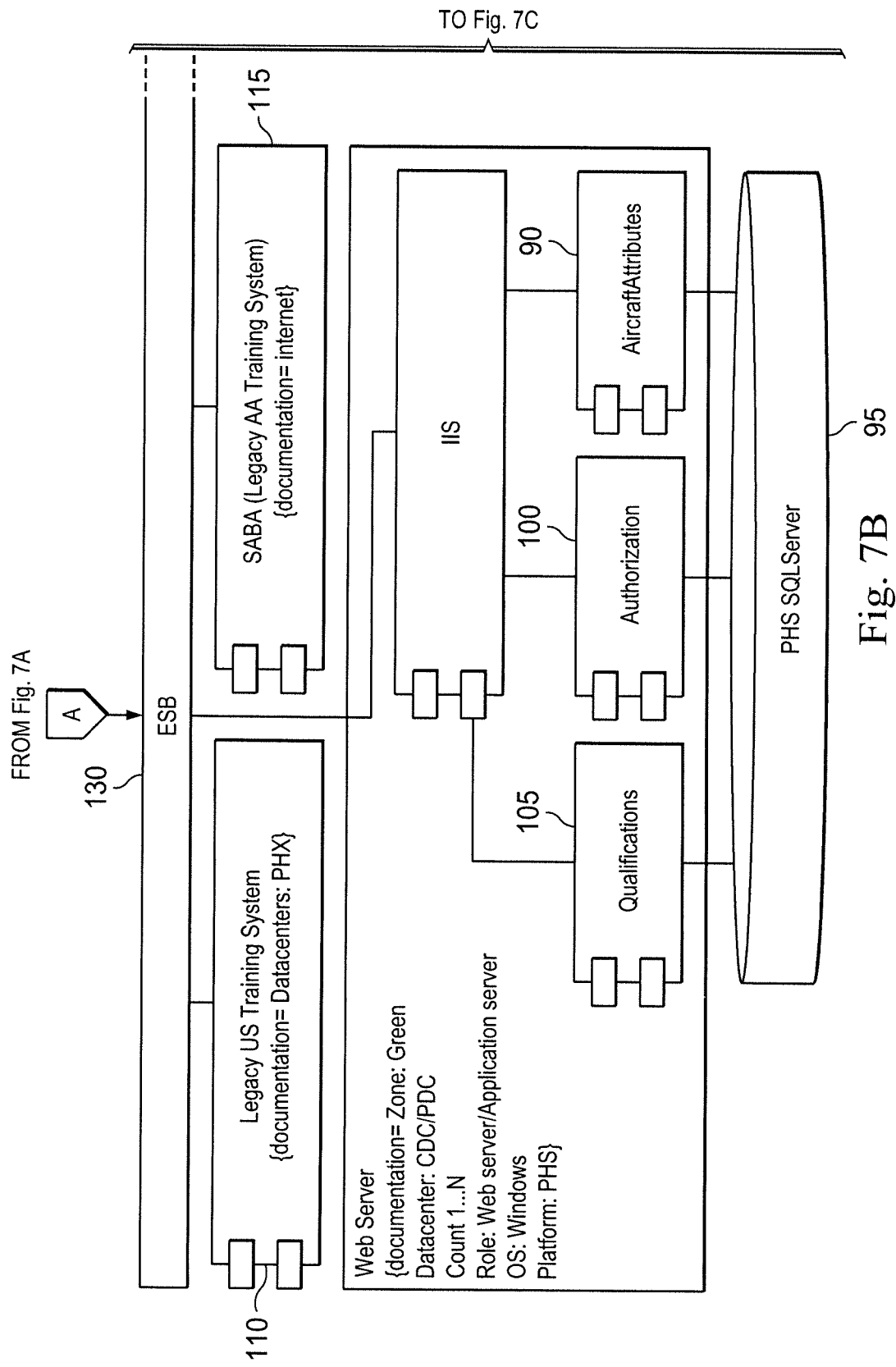
Figure 7C:
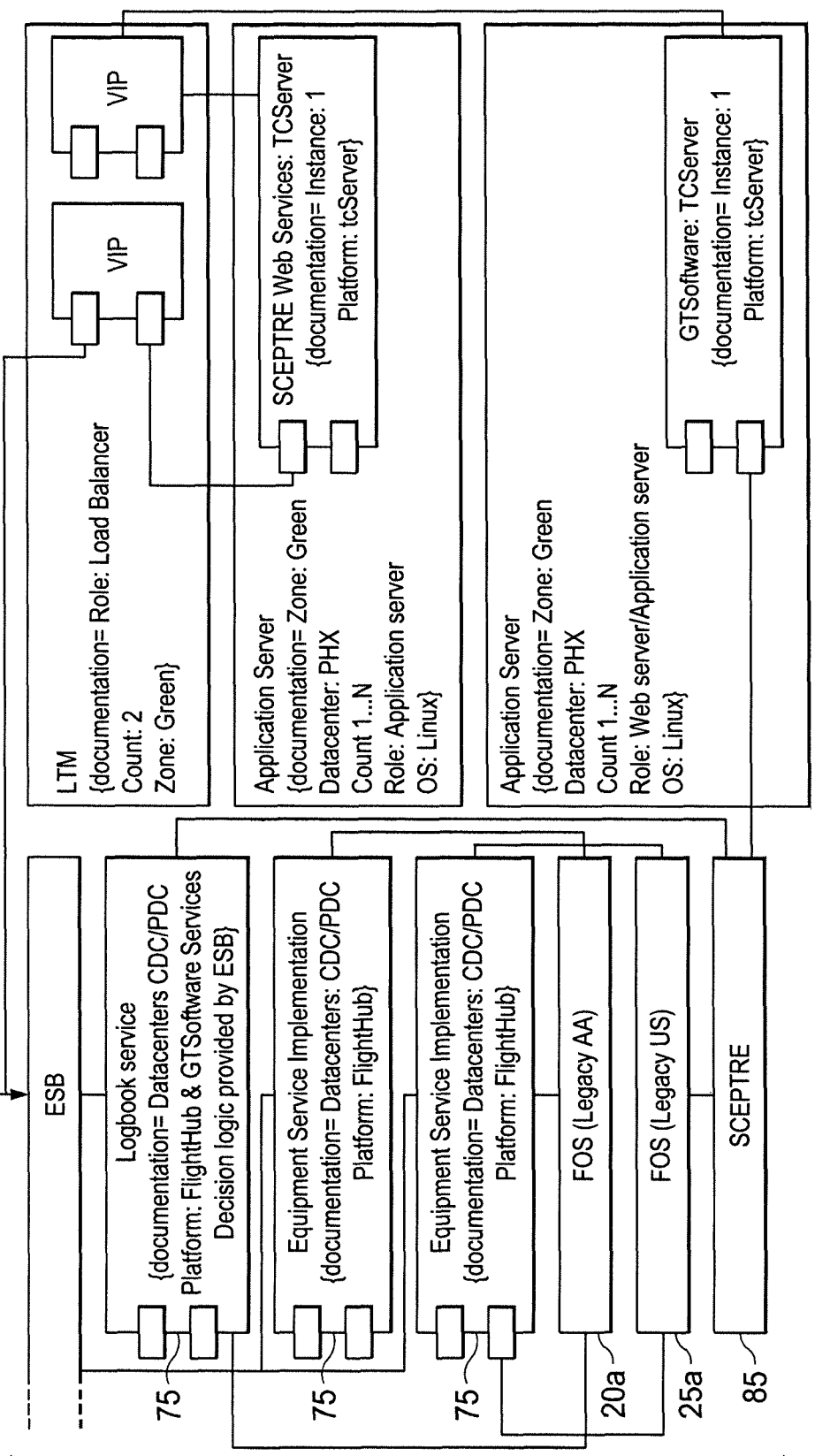

FIGS. 7A-7C are configuration views of the system 10, according to an exemplary embodiment. In an exemplary embodiment, the SAFE application 15 is a standard multitier application with a base of services exposed via the eSOA. Generally, the SAFE application 15 is internet accessible in order to provide access to computing devices, such as the computer 30 via the network 35, such as a cellular network. In an exemplary embodiment, the system 10 includes a web application server, which in several exemplary embodiments includes and/or executes one or more web-based programs, Intranet-based programs, and/or any combination thereof. In an exemplary embodiment, the network 35 includes the Internet, one or more local area networks, one or more wide area networks, one or more cellular networks, one or more wireless networks, one or more voice networks, one or more data networks, one or more communication systems, and/or any combination thereof. In an exemplary embodiment, the system 10 includes one or more computer processors and a non-transitory computer readable medium operably coupled thereto. Instructions accessible to, and executable by, the computer processor are stored on the non-transitory computer readable medium. A database is also stored in the non-transitory computer readable medium. In an exemplary embodiment, the web application server is adapted to be in communication with the computer 30, the first legacy computer system 20, and the second legacy computer system 25. In an exemplary embodiment, the non-transitory computer readable medium is at least part of one, or both, of the computer 30 and the application server. In an exemplary embodiment, the one or more computer processors is at least part of one, or both, of the computer 30 and the application server.

In one or more exemplary embodiments, the computer 30 includes a computer processor and a computer readable medium operably coupled thereto. Instructions accessible to, and executable by, the computer processor are stored on the computer readable medium. A database is also stored in the computer readable medium. In an exemplary embodiment, the computer 30 includes an input device and an output device. In an exemplary embodiment, web browser software is stored in the computer readable medium of the computer 30. In an exemplary embodiment, the input device is a keyboard, mouse, or other device coupled the computer 30 that sends instructions to the computer 30. In an exemplary embodiment, the input device and the output device include the user graphical interface 30a, which, in several exemplary embodiments, is in the form of, or includes, one or more digital displays, one or more liquid crystal displays, one or more cathode ray tube monitors, and/or any combination thereof. In an exemplary embodiment, the input device is the output device, and the output device is the input device. In several exemplary embodiments, the computer 30 is a mobile device or is a thin client. In several exemplary embodiments, the computer 30 is a thick client. In several exemplary embodiments, the computer 30 functions as both a thin client and a thick client. In several exemplary embodiments, the computer 30 is, or includes, a telephone, a personal computer, a personal digital assistant, a cellular telephone, other types of telecommunications devices, other types of computing devices, and/or any combination thereof. In several exemplary embodiments, the computer 30 includes a plurality of remote user devices. In an exemplary embodiment, the computer 30 is capable of running or executing an application.

Figure 8A:
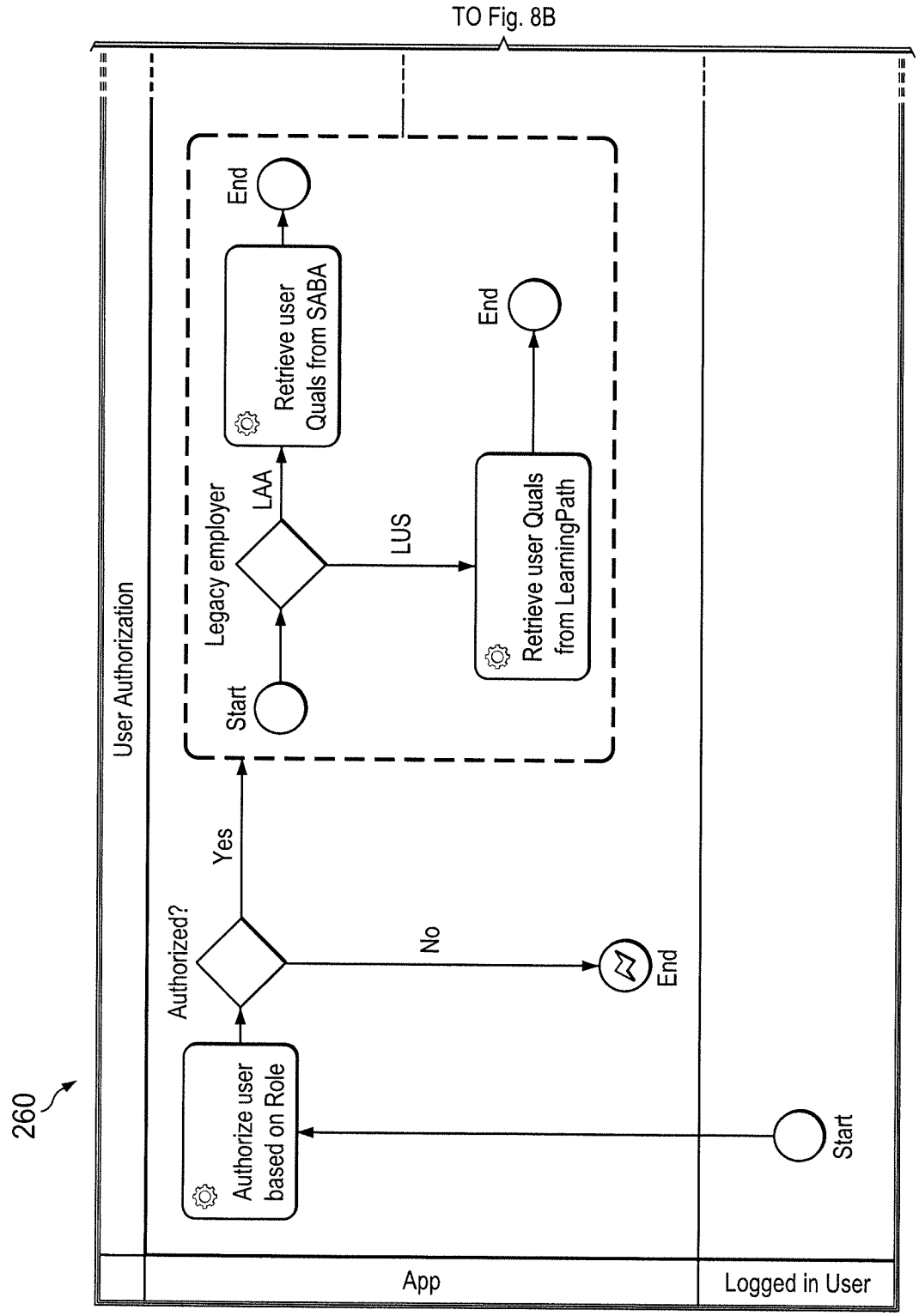
FIG. 8A-8C are flow chart illustrations of yet another process flow of the system of FIG. 1, according to an exemplary embodiment.
Figure 8B:
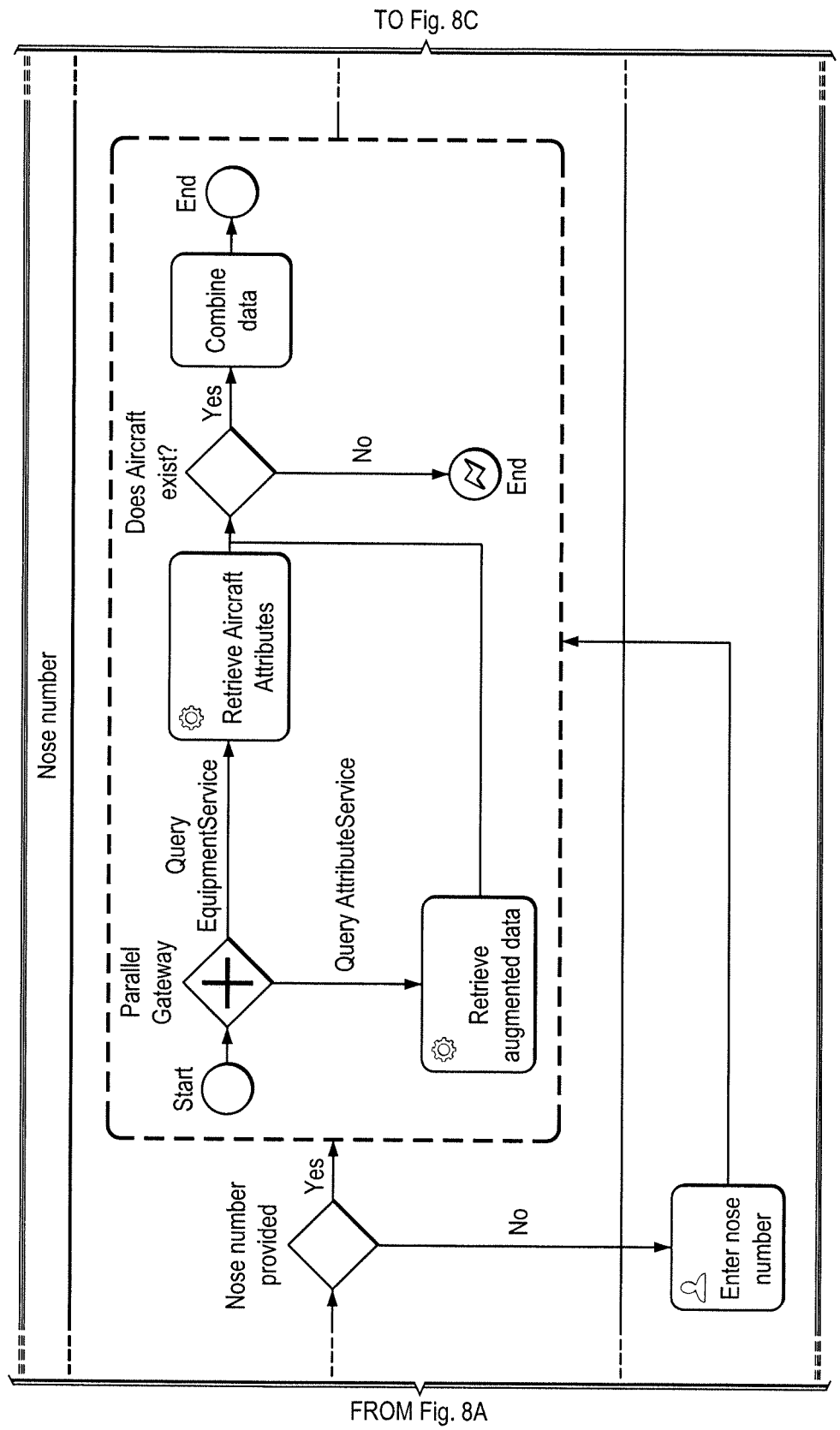
Figure 8C:
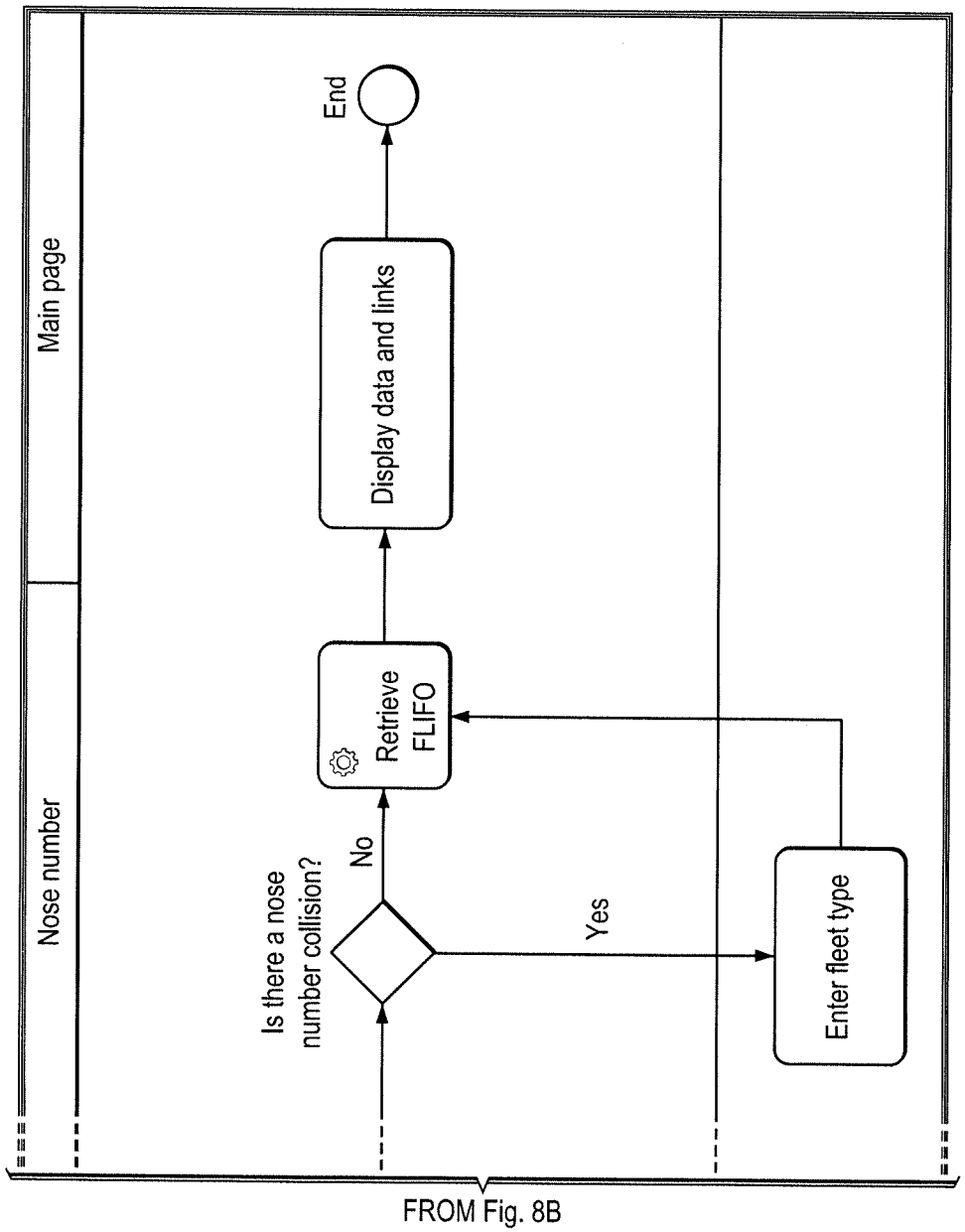

FIGS. 8A-8C illustrate another process of the system 10, the process being generally referred to by the reference numeral 260. In response to the user logging into the system 10 via the webpage of the SAFE application 15, the SAFE application 15 determines whether the user is "authorized" based on the user's role. If the user is not authorized, then the process ends. If the user is authorized, then the SAFE application 15 determines if the legacy employer of the user is the first legacy airline or the second legacy airline. If the user has a legacy employer that is the first legacy airline and data associated with the user is associated with the first legacy computer system 20, then the SAFE application 15 retrieves the qualifications of the user from the SABA system 115. However, the retrieval of qualifications of the user from the SABA system 115 may be omitted. If the user has a legacy employer that is the second legacy airline and data associated with the user is associated with the second legacy computer system 25, then the SAFE application 15 retrieves the qualifications of the user from the Learning Path system 110. After retrieving the qualification of the user, the user inputs the nose number of an aircraft. In response, the SAFE application 15 retrieves any available augmented data associated with the aircraft in the Attributes system 90 and combines any augmented data with data retrieved from the Equipment Services system 70 that is associated with the aircraft. Then, the SAFE application 15 determines if there is a nose number collision. If so, then the SAFE Application 15 requests and receives, using a webpage, from the user the fleet type of the aircraft. Next, the SAFE application 15 retrieves FLIFO and displays data and links to the user using another webpage.

In several exemplary embodiments, the SAFE application 15 provides mechanics the functionality to view and enter aircraft maintenance discrepancies, including minimum equipment lists ("MELs"), via the single common front end application. In an exemplary embodiment, all aspects of the log page entry are included in the SAFE application 15 (i.e., part changes, lower order checks, MELs, Maintenance Item Sheet ("MIC sheet"), etc.). In an exemplary embodiment, all applicable data items displayed by the SAFE application 15 are harmonized and match the current log book format. In an exemplary embodiment, the SAFE application 15 updates back end systems automatically without the mechanic having to know data entry formats for either the first legacy computer system 20 or the second legacy computer system 25. In an exemplary embodiment, the SAFE application 15 directs the mechanic in the "right" direction from an aircraft "maintenance program" perspective.

In several exemplary embodiments, a first commercial airline carrier that is no longer in operation is associated with the first legacy airline, a second commercial airline carrier that is no longer in operation is associated with the second legacy airline, and a third commercial airline carrier that is in operation and was formed by a merger of the first and second commercial airlines implements the SAFE application 15 to easily view, edit, and delete data within the first legacy computer system 20 and the second legacy computer system 25.

In several exemplary embodiments, the SAFE application 15 ensures that mechanics are qualified to perform all assigned maintenance tasks. In several exemplary embodiments, the SAFE application 15 allows for harmonization of the Oil Servicing Program and avoids confusion and additional training for mechanics before the aircrafts from the first legacy airline and the second legacy airline are consolidated into one maintenance program. In several exemplary embodiments, the SAFE application 15 gives more assistance and information to the mechanics for duplicate aircraft by providing (displaying on a user interface 30a) current flight and routing information. In an exemplary embodiment, this supports functionality that locks the aircraft final weight balance information if critical maintenance functions are not performed, such as the checks or transit checks for Extended-range twin-engine operations ("ETOP"). In several exemplary embodiments, the SAFE application 15 protects mechanics and the third commercial airline from non-compliance. In an exemplary embodiment, the SAFE application 15 simplifies training requirements of a large workforce and provides automation to help the mechanics get to the proper legacy systems. In several exemplary embodiments, the SAFE application 15 reconciles differences in data schema between the first legacy computer system 20 and the second legacy computer system 25 in order to have a united interface for the third commercial airline. In several exemplary embodiments, the SAFE application 15 includes a single interface that allows mechanics to view, add, or edit data from two different legacy systems (i.e., the first legacy computer system 20 and the second legacy computer system 25). In several exemplary embodiments, the SAFE application 15 is a web-based data entry portal that is a tool to channel mechanics to a compliant process. In an exemplary embodiment, the SAFE application 15 allows for common data sources to be directed to different legacy systems (i.e., the first legacy computer system 20 and the second legacy computer system 25) as needed and maintains a well-structured data map for future system migration. In an exemplary embodiment, the SAFE application 15 is a common front end for AMT's that allows each AMT to enter pertinent aircraft maintenance information into legacy systems (i.e., the first legacy computer system 20 and the second legacy computer system 25) without having extensive training on those systems. In an exemplary embodiment, the SAFE application 15 has a database that allows it to track aircraft in both fleets (AA and US) before and after the aircraft is migrated to the "end state" system.

In several exemplary embodiments, the system 10 includes an arrangement of elements (i.e., the SAFE application 15, the first legacy computer system 20, and the second legacy computer system 25) that is a technical improvement over the previous ways of accessing data in two legacy computer systems. The system 10 is a technical solution to the aforementioned problems associated with the merging of two legacy airlines and their computer systems and maintenance crews. Moreover, the SAFE application 15 enforces a layer of input validation and controls to result in faster and more efficient data entry into the first legacy computer system 20 and the second legacy computer system 25. In an exemplary embodiment, the SAFE application 15 joins two disparate systems (i.e., the first legacy computer system 20 and the second legacy computer system 25) into a unified interface. In order to join two disparate systems, the SAFE application 15 reconciles the differences in the data schema of the first legacy computer system 20 and the second legacy computer system 25.

In several exemplary embodiments, the SAFE application 15 provides automation that forces the mechanics into the correct legacy carrier system. In an exemplary embodiment, the first legacy computer system 20 has a portal for mechanics, which is ViaNet, and the second legacy computer system 25 has a portal for mechanics, which is Mechanic home page. In an exemplary embodiment, M&E requires similar style links, accessible from all work stations (elimination of LUS Single Sign-on Process ("SSO")) that have the logic built into them to direct them to the correct legacy system, based on the mechanic entering the nose number at some point in the decision logic. In an exemplary embodiment, the SAFE application 15 is a common website to be used by all of the AMT's and is intended to embrace the culture of both the first and the second legacy airlines and help communicate integration changes.

In several exemplary embodiments, the system 10 and/or the method 150 unify the maintenance business process across both legacy airlines (AA and US Airways) by which aircraft mechanics access aircraft attributes (e.g., engine type, registration number, etc.) and maintenance history information, and create new logbook entries via a single user interface (i.e., the SAFE application 15) that is independent of the legacy systems to which it communicates. In an exemplary embodiment, the SAFE application 15 allows all mechanics, whether from legacy AA or legacy US Airways, to follow a single process to accomplish and record their work, even where there may be vast differences in how that data is stored and managed on the legacy systems. In an exemplary embodiment, this results in improved efficiency in training and business processes, but it also significantly reduces risk of incorrect data entry or other mistakes, considering mechanics are not required to alternate between two entirely different processes dependent upon which aircraft they may be working on. Thus, mechanics can access information such as aircraft model, engine type, seating configuration, etc., routing data, procedure manuals and logbook history using the SAFE application 15. In an exemplary embodiment, mechanics can also create new logbook entries using the SAFE application 15, including all types of deferrals, details of parts and labor required, and other information essential to planning and scheduling maintenance work on an aircraft without being familiar with any of the archaic commands typically used in legacy applications.

In several exemplary embodiments, the SAFE application 15 and/or the method 150 eliminates the need to learn, understand, and use archaic DOS-based commands and codes associated with each of the legacy systems; reduces the risk that a mechanic might inadvertently follow an incorrect procedure considering the SAFE application 15 unifies processes across the third commercial airline; helps facilitate quicker integration of the two legacy airlines by removing any differences in business processes, while also enforcing compliance with safety requirements; is available via most standard web browsers, rather than being limited to proprietary system and hardware; allows for greater range of input validation and error handling; and enables greater use of pre-populated data to reduce invalid entries and typographical errors.

In several exemplary embodiments, the SAFE application 15 and/or the method 150 prevents training aircraft mechanics from one legacy carrier on a system specific to the other legacy carrier. In several exemplary embodiments, the SAFE application 15 and/or the method 150 enables the business unit to immediately achieve workforce unity, as opposed to cross-training all mechanics on both legacy carrier systems. In several exemplary embodiments, the SAFE application 15 and/or the method 150 eliminates the need for cross-training aircraft mechanics, thus reducing the risk associated with introducing new procedures that are not applicable in all situations. In several exemplary embodiments, the SAFE application 15 and/or the method 150 supersedes manual processes, such as hand-written log entries, and thus reduces opportunities for error in the misreading written entries.

In several exemplary embodiments, the system 10 and the method 150 according to respective exemplary embodiments implement an application for one or more airlines capable of supporting all event logging requirements, and connect to non-TPF-based flight operations applications via a message handling system, and are compatible with existing and planned hardware and flexible to allow for expansion if required. In several exemplary embodiments, such a message handling system may be referred to as "Flight Hub." In several exemplary embodiments, one or more exemplary embodiments of such a message handling system, or Flight Hub, may be described and illustrated in whole or in part in U.S. application Ser. No. 11/119,787, filed May 2, 2005, which issued on Dec. 11, 2012 as U.S.

Pat. No. 8,332,473 to Fouts et al., the entire disclosures of which are hereby incorporated herein by reference.

In several exemplary embodiments, the system 10 and the method 150 according to respective exemplary embodiments implement an application for one or more airlines that manages maintenance activities. In several exemplary embodiments, such a maintenance management application may be referred to as "ViaNet." In several exemplary embodiments, one or more exemplary embodiments of such a maintenance management application, or ViaNet, may be described and illustrated in whole or in part in U.S. application Ser. No. 12/475,092, filed May 29, 2009, which issued on Aug. 28, 2012 as U.S. Pat. No. 8,255,097 to Wander, the entire disclosures of which are hereby incorporated herein by reference.

Figure 9:
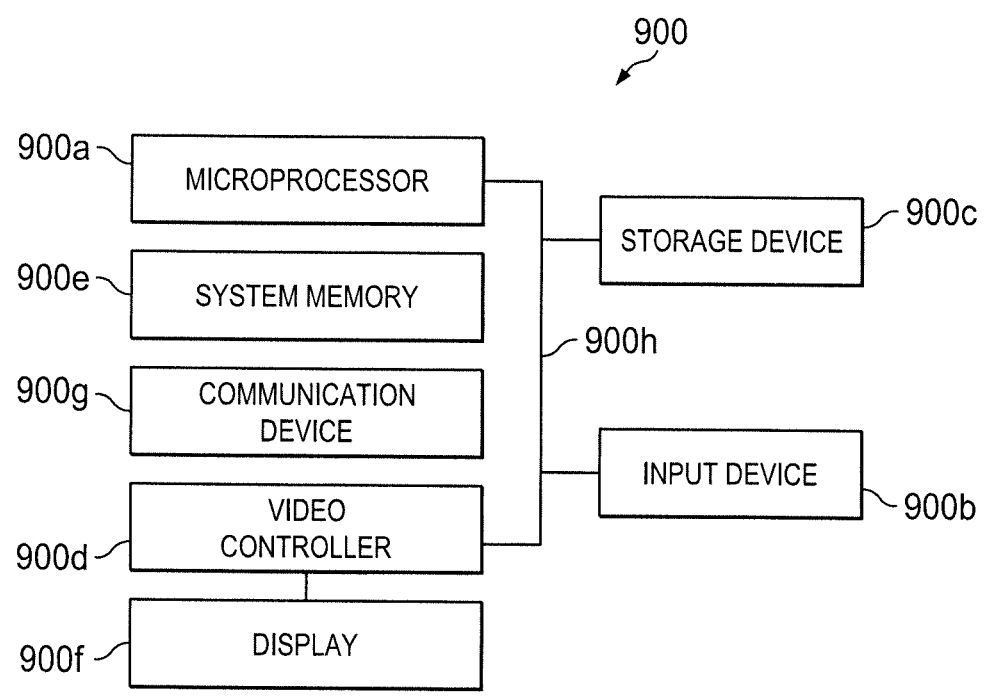
FIG. 9 is a diagrammatic illustration of a node for implementing one or more exemplary embodiments of the present disclosure, according to an exemplary embodiment.

In an exemplary embodiment, as illustrated in FIG. 9 with continuing reference to FIGS. 1-5, 6A-6E, 7A-7C, and 8A-8C, an illustrative node 900 for implementing one or more of the exemplary embodiments described above, illustrated in FIGS. 1-5, 6A-6E, 7A-7C, and 8A-8C is depicted. The node 900 includes a microprocessor 900a, an input device 900b, a storage device 900c, a video controller 900d, a system memory 900e, a display 900f, and a communication device 900g all interconnected by one or more buses 900h. In several exemplary embodiments, the storage device 900c may include a floppy drive, hard drive, CD-ROM, optical drive, any other form of storage device and/or any combination thereof. In several exemplary embodiments, the storage device 900c may include, and/or be capable of receiving, a floppy disk, CD-ROM, DVD-ROM, or any other form of computer-readable medium that may contain executable instructions. In several exemplary embodiments, the communication device 900g may include a modem, network card, or any other device to enable the node to communicate with other nodes. In several exemplary embodiments, any node represents a plurality of interconnected (whether by intranet or Internet) computer systems, including without limitation, personal computers, mainframes, personal digital assistants ("PDAs"), smartphones and cell phones.

In several exemplary embodiments, one or more of the components of the systems described above, illustrated in FIGS. 1-5, 6A-6E, 7A-7C, and 8A-8C include at least the node 900 and/or components thereof, and/or one or more nodes that are substantially similar to the node 900 and/or components thereof. In several exemplary embodiments, one or more of the above-described components of the node 900 and/or the system illustrated in FIGS. 1-5, 6A-6E, 7A-7C, and 8A-8C, include respective pluralities of same components.

In several exemplary embodiments, the system 10 illustrated in FIGS. 1-5, 6A-6E, 7A-7C, and 8A-8C includes a computer program that includes a plurality of instructions, data, and/or any combination thereof; an application written in, for example, Arena, HyperText Markup Language (HTML), Cascading Style Sheets (CSS), JavaScript, Extensible Markup Language (XML), asynchronous JavaScript and XML (Ajax), and/or any combination thereof; a web-based application written in, for example, Java or Adobe Flex, which in several exemplary embodiments pulls real-time information from one or more servers, automatically refreshing with latest information at a predetermined time increment; or any combination thereof.

In several exemplary embodiments, a computer or a computer system typically includes at least hardware capable of executing machine readable instructions, as well as the software for executing acts (typically machine-readable instructions) that produce a desired result. In several exemplary embodiments, a computer system may include hybrids of hardware and software, as well as computer sub-systems.

In several exemplary embodiments, hardware generally includes at least processor-capable platforms, such as client-machines (also known as personal computers or servers), and hand-held processing devices (such as smart phones, tablet computers, PDAs, or personal computing devices (PCDs), for example). In several exemplary embodiments, hardware may include any physical device that is capable of storing machine-readable instructions, such as memory or other data storage devices. In several exemplary embodiments, other forms of hardware include hardware sub-systems, including transfer devices such as modems, modem cards, ports, and port cards, for example.

In several exemplary embodiments, software includes any machine code stored in any memory medium, such as RAM or ROM, and machine code stored on other devices (such as floppy disks, flash memory, or a CD ROM, for example). In several exemplary embodiments, software may include source or object code. In several exemplary embodiments, software encompasses any set of instructions capable of being executed on a node such as, for example, on a client machine or server.

In several exemplary embodiments, combinations of software and hardware could also be used for providing enhanced functionality and performance for certain embodiments of the present disclosure. In an exemplary embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several exemplary embodiments, computer readable mediums include, for example, passive data storage, such as a random access memory (RAM) as well as semi-permanent data storage such as a compact disk read only memory (CD-ROM). One or more exemplary embodiments of the present disclosure may be embodied in the RAM of a computer to transform a standard computer into a new specific computing machine. In several exemplary embodiments, data structures are defined organizations of data that may enable an embodiment of the present disclosure. In an exemplary embodiment, a data structure may provide an organization of data, or an organization of executable code.

In several exemplary embodiments, a database may be any standard or proprietary database software, such as Oracle, Microsoft Access, SyBase, or DBase II, for example. In several exemplary embodiments, the database may have fields, records, data, and other database elements that may be associated through database specific software. In several exemplary embodiments, data may be mapped. In several exemplary embodiments, mapping is the process of associating one data entry with another data entry. In an exemplary embodiment, the data contained in the location of a character file can be mapped to a field in a second table. In several exemplary embodiments, the physical location of the database is not limiting, and the database may be distributed. In an exemplary embodiment, the database may exist remotely from the server, and run on a separate platform. In an exemplary embodiment, the database may be accessible across the Internet. In several exemplary embodiments, more than one database may be implemented.

In several exemplary embodiments, a plurality of instructions stored on a computer readable medium may be executed by one or more processors to cause the one or more processors to carry out or implement in whole or in part the above-described operation of each of the above-described exemplary embodiments of the system, the method, and/or any combination thereof. In several exemplary embodiments, such a processor may include one or more of the microprocessor 900a, any processor(s) that are part of the components of the system, and/or any combination thereof, and such a computer readable medium may be distributed among one or more components of the system. In several exemplary embodiments, such a processor may execute the plurality of instructions in connection with a virtual computer system. In several exemplary embodiments, such a plurality of instructions may communicate directly with the one or more processors, and/or may interact with one or more operating systems, middleware, firmware, other applications, and/or any combination thereof, to cause the one or more processors to execute the instructions.

A method of accessing data in one of a first legacy computer system that has a first operating system and a second legacy computer system that has a second operating system that is different from the first operating system has been described that includes providing a front end application that is in communication with each of the first legacy computer system and the second legacy computer system, wherein the front end application is displayed on a graphical user interface of a computer; receiving, via a first webpage displayed on the computer and using the front end application, a plurality of inputs that includes: a generic command that is generic to the first operating system and the second operating system; and an aircraft identifier; determining, based on the aircraft identifier, whether data related to the aircraft identifier is associated with the first legacy computer system or the second legacy computer system; if the data related to the aircraft identifier is associated with the first legacy computer system, then transforming the generic command to a first operating system command; and if the data related to the aircraft identifier is associated with the second legacy computer system, then transforming the generic command to a second operating system command; wherein the first operating system command is different from the second operating system command, and thus the transformation of the generic command to either the first operating system command or the second operating system command reconciles differences in data schema associated with the first and the second legacy computer systems and allows for the front end application to be a single common front end application to access data within both the first and second legacy computer systems. In an exemplary embodiment, at least one of the first legacy computer system and the second legacy computer system is a non-web based system; and the single common front end application is a web-based application configured to access the first legacy computer system and the second legacy computer system thereby allowing a user of the single common front end application to access the first legacy computer system and the second legacy computer system using a web browser. In an exemplary embodiment, when the data related to the aircraft identifier is associated with the first legacy computer system, the method further includes executing the first operating system command; and wherein at least a portion of the data related to the aircraft identifier is displayed in a second webpage on the computer using the single common front end application in response to the execution of the first operating system command. In an exemplary embodiment, the generic command is to search for the data related to the aircraft identifier and the first operating system command is to search for the data related to the aircraft identifier; and the at least a portion of the data related to the aircraft identifier includes maintenance history for the aircraft associated with the aircraft identifier. In an exemplary embodiment, the plurality of inputs further includes a user identifier that is associated with a user of the single common front end application; the method further includes customizing a third webpage using the single common front end application based on the user identifier received; and customizing the third webpage based on the user identifier received prevents displaying work instructions to the user when the user is an unauthorized user. In an exemplary embodiment, the single common front end application validates at least one input from the plurality of inputs. In an exemplary embodiment, transforming the generic command to the first operating system command includes: generating a JSON object that includes at least one input from the plurality of inputs; generating, using the JSON object, a first SOAP message including a header that includes a first legacy computer system identifier; identifying, at a second application, the first legacy computer system identifier in the first SOAP message; generating, using the first SOAP message, a second SOAP message at a third application, the second SOAP message including a first command stack; and generating, at a fourth application, a second command stack using the second SOAP message, wherein the second command stack is used to generate the first operating system command. In an exemplary embodiment, transforming the generic command to the second operating system command includes: generating a JSON object that includes at least one input from the plurality of inputs; generating, using the JSON object, a third SOAP message including a header that includes a second legacy computer system identifier; identifying, at a fifth application, the second legacy computer system identifier in the third SOAP message; and generating, at a sixth application, a fourth SOAP message using the third SOAP message, wherein the fourth SOAP message is used to generate the second operating system command. In an exemplary embodiment, the first operating system is a SABRE system. In an exemplary embodiment, the second operating system is a SCEPTRE system.

A system has been described that includes a first legacy computer system that has a first operating system; a second legacy computer system that has a second operating system that is different from the first operating system; a computer; and a non-transitory computer readable medium, the non-transitory computer readable medium including a plurality of instructions that are executable by one or more processors, the plurality of instructions including: instructions that cause the one or more processors to receive a plurality of inputs from the computer, the plurality of instructions including: a generic command that is generic to the first operating system and the second operating system; and an aircraft identifier; instructions that cause the one or more processors to determine, based on the aircraft identifier, whether data related to the aircraft identifier is associated with the first legacy computer system or the second legacy computer system; instructions that cause the one or more processors to transform the generic command to a first operating system command if the data related to the aircraft identifier is associated with the first legacy computer system; and instructions that cause the one or more processors to transform the generic command to a second operating system command if the data related to the aircraft identifier is associated with the second legacy computer system; wherein the first operating system command is different from the second operating system command, and thus the transformation of the generic command to either the first operating system command or the second operating system command reconciles differences in data schema associated with the first and the second legacy computer systems and allows for a single common front end application to be displayed on the computer and to access data within both the first and second legacy computer systems. In an exemplary embodiment, the system also includes an application server adapted to be in communication with each of the computer, the first legacy computer system, and the second legacy computer system, wherein the non-transitory computer readable medium is at least part of one, or both, of the computer and the application server, and wherein the one or more processors is at least part of one, or both, of the computer and the application server. In an exemplary embodiment, at least one of the first legacy computer system and the second legacy computer system is a non-web based system; and wherein the single common front end application is a web-based application configured to access the first legacy computer system and the second legacy computer system thereby allowing a user of the single common front end application to access the first legacy computer system and the second legacy computer system using a web browser. In an exemplary embodiment, when the data related to the aircraft identifier is associated with the first legacy computer system; wherein the plurality of instructions further include instructions that cause the one or more processors to execute the first operating system command; and wherein at least a portion of the data related to the aircraft identifier is displayed in a webpage on the computer using the common front end application in response to the execution of the first operating system command. In an exemplary embodiment, the generic command is to search for the data related to the aircraft identifier and the first operating system command is to search for the data related to the aircraft identifier; and wherein at least a portion of the data related to the aircraft identifier includes maintenance history for the aircraft associated with the aircraft identifier. In an exemplary embodiment, the plurality of inputs further includes a user identifier that is associated with a user of the common front end application; the plurality of instructions further include instructions that cause the one or more processors to customize a third webpage to be displayed using the single common front end application based on the user identifier received; and customizing the third webpage based on the user identifier received prevents displaying work instructions to the user when the user is an unauthorized user. In an exemplary embodiment, the single common front end application validates at least one inputs from the plurality of inputs. In an exemplary embodiment, the instructions that cause the one or more processors to transform the generic command to the first operating system command if the data related to the aircraft identifier is associated with the first legacy computer system includes: instructions that cause the one or more processors to generate a JSON object that includes at least one input from the plurality of inputs; instructions that cause the one or more processors to generate, using the JSON object, a first SOAP message including a header that includes a first legacy computer system identifier; instructions that cause the one or more processors to identify, at a second application, the first legacy computer system identifier in the first SOAP message; instructions that cause the one or more processors to generate, using the first SOAP message, a second SOAP message at a third application, the second SOAP message including a first command stack; and instructions that cause the one or more processors to generate, at a fourth application, a second command stack using the second SOAP message, wherein the second command stack is used to generate the first operating system command. In an exemplary embodiment, the instructions that cause the one or more processors to transform the generic command to the second operating system command if the data related to the aircraft identifier is associated with the second legacy computer system includes: instructions that cause the one or more processors to generate a JSON object that includes at least one input from the plurality of inputs; instructions that cause the one or more processors to generate, using the JSON object, a third SOAP message including a header that includes a second legacy computer system identifier; instructions that cause the one or more processors to identify, at a fifth application, the second legacy computer system identifier in the third SOAP message; and instructions that cause the one or more processors to generate, at a sixth application, a fourth SOAP message using the third SOAP message, wherein the fourth SOAP message is used to generate the second operating system command. In an exemplary embodiment, the first operating system is a SABRE system and the second operating system is a SCEPTRE system.

It is understood that variations may be made in the foregoing without departing from the scope of the present disclosure. For example, instead of, or in addition to transportation transactions often conducted in the course of airline industry business, aspects of the present disclosure are applicable and/or readily adaptable to transportation transactions conducted in other industries, including rail, bus, cruise and other travel or shipping industries, rental car industries, hotels and other hospitality industries, entertainment industries, and other industries. In an exemplary embodiment, aspects of the present disclosure are readily applicable and/or readily adaptable to legacy systems within a variety of industries, such as shipping industries, train-related industries, etc.

In several exemplary embodiments, the elements and teachings of the various illustrative exemplary embodiments may be combined in whole or in part in some or all of the illustrative exemplary embodiments. In addition, one or more of the elements and teachings of the various illustrative exemplary embodiments may be omitted, at least in part, and/or combined, at least in part, with one or more of the other elements and teachings of the various illustrative embodiments.

Any spatial references such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In several exemplary embodiments, while different steps, processes, and procedures are described as appearing as distinct acts, one or more of the steps, one or more of the processes, and/or one or more of the procedures may also be performed in different orders, simultaneously and/or sequentially. In several exemplary embodiments, the steps, processes and/or procedures may be merged into one or more steps, processes and/or procedures.

In several exemplary embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although several exemplary embodiments have been described in detail above, the embodiments described are exemplary only and are not limiting, and those skilled in the art will readily appreciate that many other modifications, changes and/or substitutions are possible in the exemplary embodiments without materially departing from the novel teachings and advantages of the present disclosure. Accordingly, all such modifications, changes and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the applicant not to invoke 35 U.S.C. § 112, paragraph 6 for any limitations of any of the claims herein, except for those in which the claim expressly uses the word "means" together with an associated function.

What is claimed is:

1. A system comprising:
    a first legacy computer system that has a first operating system;
    a second legacy computer system that has a second operating system that is different from the first operating system;
    a computer; and
    a non-transitory computer readable medium, the non-transitory computer readable medium comprising a plurality of instructions that are executable by one or more processors, the plurality of instructions comprising:
        instructions that cause the one or more processors to receive a plurality of inputs from the computer, the plurality of inputs comprising:
            a generic command that is generic to the first operating system and the second operating system; and
            an aircraft identifier;
        instructions that cause the one or more processors to determine, based on the aircraft identifier, whether data related to the aircraft identifier is associated with the first legacy computer system or the second legacy computer system;
        instructions that cause the one or more processors to transform the generic command to a first operating system command if the data related to the aircraft identifier is associated with the first legacy computer system; and
        instructions that cause the one or more processors to transform the generic command to a second operating system command if the data related to the aircraft identifier is associated with the second legacy computer system;
        wherein the first operating system command is different from the second operating system command, and thus the transformation of the generic command to either the first operating system command or the second operating system command reconciles differences in data schema associated with the first and the second legacy computer systems and allows for a single common front end application to be displayed on the computer and to access data within both the first and second legacy computer systems.

2. The system of claim 1, further comprising an application server adapted to be in communication with each of the computer, the first legacy computer system, and the second legacy computer system, wherein the non-transitory computer readable medium is at least part of one, or both, of the computer and the application server, and wherein the one or more processors is at least part of one, or both, of the computer and the application server.

3. The system of claim 1,
    wherein at least one of the first legacy computer system and the second legacy computer system is a non-web based system; and
    wherein the single common front end application is a web-based application configured to access the first legacy computer system and the second legacy computer system thereby allowing a user of the single common front end application to access the first legacy computer system and the second legacy computer system using a web browser.

4. The system of claim 1, wherein, when the data related to the aircraft identifier is associated with the first legacy computer system; wherein the plurality of instructions further comprise instructions that cause the one or more processors to execute the first operating system command; and wherein at least a portion of the data related to the aircraft identifier is displayed in a webpage on the computer using the single common front end application in response to the execution of the first operating system command.

5. The system of claim 1,
    wherein the generic command is to search for the data related to the aircraft identifier and the first operating system command is to search for the data related to the aircraft identifier; and
    wherein at least a portion of the data related to the aircraft identifier includes maintenance history for the aircraft associated with the aircraft identifier.

6. The system of claim 1,
    wherein the plurality of inputs further comprises a user identifier that is associated with a user of the single common front end application;
    wherein the plurality of instructions further comprise instructions that cause the one or more processors to customize a third webpage to be displayed using the single common front end application based on the user identifier received; and
    wherein customizing the third webpage based on the user identifier received prevents displaying work instructions to the user when the user is an unauthorized user.

7. The system of claim 1, wherein the single common front end application validates at least one input from the plurality of inputs.

8. The system of claim 1, wherein the instructions that cause the one or more processors to transform the generic command to the first operating system command if the data related to the aircraft identifier is associated with the first legacy computer system comprises:
    instructions that cause the one or more processors to generate a JSON object that includes at least one input from the plurality of inputs;
    instructions that cause the one or more processors to generate, using the JSON object, a first SOAP message comprising a header that includes a first legacy computer system identifier;
    instructions that cause the one or more processors to identify, at a second application, the first legacy computer system identifier in the first SOAP message;
    instructions that cause the one or more processors to generate, using the first SOAP message, a second SOAP message at a third application, the second SOAP message comprising a first command stack; and instructions that cause the one or more processors to generate, at a fourth application, a second command stack using the second SOAP message, wherein the second command stack is used to generate the first operating system command.

9. The system of claim 1, wherein the instructions that cause the one or more processors to transform the generic command to the second operating system command if the data related to the aircraft identifier is associated with the second legacy computer system comprises:
instructions that cause the one or more processors to generate a JSON object that includes at least one input from the plurality of inputs;
instructions that cause the one or more processors to generate, using the JSON object, a third SOAP message comprising a header that includes a second legacy computer system identifier;
instructions that cause the one or more processors to identify, at a fifth application, the second legacy computer system identifier in the third SOAP message; and
instructions that cause the one or more processors to generate, at a sixth application, a fourth SOAP message using the third SOAP message, wherein the fourth SOAP message is used to generate the second operating system command.

10. The system of claim 1, wherein the first operating system is a SABRE system and the second operating system is a SCEPTRE system.

11. A system comprising:
a first legacy computer system that has a first operating system;
a second legacy computer system that has a second operating system that is different from the first operating system;
one or more computers configured to:
receive a plurality of inputs, the plurality of inputs comprising a generic command that is generic to the first operating system and the second operating system, and an aircraft identifier;
determine, based on the aircraft identifier, whether data related to the aircraft identifier is associated with the first legacy computer system or the second legacy computer system;
transform the generic command to a first operating system command if the data related to the aircraft identifier is associated with the first legacy computer system; and
transform the generic command to a second operating system command if the data related to the aircraft identifier is associated with the second legacy computer system;
wherein the first operating system command is different from the second operating system command, and thus the transformation of the generic command to either the first operating system command or the second operating system command reconciles differences in data schema associated with the first and the second legacy computer systems and allows data to be accessed data within both the first and second legacy computer systems;
wherein the system further comprises a single common front end application configured to be displayed on at least one of the one or more computers and access the data within the first and second legacy computer systems;
wherein the reconciliation of the differences in data schema associated with the first and the second legacy computer systems allows for the single common front end application to be displayed on the at least one of the one or more computers, and access the data within the first and second legacy computer systems;
wherein at least one of the first legacy computer system and the second legacy computer system is a non-web based system; and
wherein the single common front end application is a web-based application configured to access the first legacy computer system and the second legacy computer system thereby allowing a user of the single common front end application to access the first legacy computer system and the second legacy computer system using a web browser.

12. The system of claim 11, wherein the single common front end application validates at least one input from the plurality of inputs.

13. The system of claim 11, wherein the first operating system is a SABRE system and the second operating system is a SCEPTRE system.

14. A system comprising:
a first legacy computer system that has a first operating system;
a second legacy computer system that has a second operating system that is different from the first operating system;
one or more computers configured to:
receive a plurality of inputs, the plurality of inputs comprising a generic command that is generic to the first operating system and the second operating system, and an identifier;
determine, based on the identifier, whether data related to the identifier is associated with the first legacy computer system or the second legacy computer system;
transform the generic command to a first operating system command if the data related to the identifier is associated with the first legacy computer system; and
transform the generic command to a second operating system command if the data related to the identifier is associated with the second legacy computer system;
wherein the first operating system command is different from the second operating system command, and thus the transformation of the generic command to either the first operating system command or the second operating system command reconciles differences in data schema associated with the first and the second legacy computer systems and allows data to be accessed data within both the first and second legacy computer systems.

15. The system of claim 14, further comprising:
a single common front end application configured to be displayed on at least one of the one or more computers and access the data within the first and second legacy computer systems.

16. The system of claim 15, wherein the reconciliation of the differences in data schema associated with the first and the second legacy computer systems allows for the single common front end application to be displayed on the at least one of the one or more computers, and access the data within the first and second legacy computer systems.

17. The system of claim 15, wherein at least one of the first legacy computer system and the second legacy computer system is a non-web based system.

18. The system of claim 17, wherein the single common front end application is a web-based application configured to access the first legacy computer system and the second legacy computer system thereby allowing a user of the single common front end application to access the first legacy computer system and the second legacy computer system using a web browser.

19. The system of claim 15, wherein the identifier is an aircraft identifier.

20. The system of claim 15, wherein the first operating system is a SABRE system, and the second operating system is a SCEPTRE system.

* * * * *